United States Patent
Sun et al.

(10) Patent No.: US 12,411,200 B2
(45) Date of Patent: Sep. 9, 2025

(54) USER EQUIPMENT LOCATION INFORMATION REPORTING METHOD, USER EQUIPMENT, AND NETWORK DEVICE

(71) Applicant: HUAWEI TECHNOLOGIES CO., LTD., Guangdong (CN)

(72) Inventors: Huiming Sun, Shanghai (CN); Hongping Zhang, Shenzhen (CN); Yingjie Yu, Shanghai (CN); Su Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 559 days.

(21) Appl. No.: 17/749,954

(22) Filed: May 20, 2022

(65) Prior Publication Data
US 2022/0342028 A1    Oct. 27, 2022

Related U.S. Application Data

(63) Continuation of application No. PCT/CN2019/120437, filed on Nov. 22, 2019.

(51) Int. Cl.
*G01S 5/00* (2006.01)
*H04L 5/00* (2006.01)
(Continued)

(52) U.S. Cl.
CPC .......... *G01S 5/0036* (2013.01); *H04L 5/0051* (2013.01); *H04W 68/005* (2013.01); *H04W 76/20* (2018.02)

(58) Field of Classification Search
CPC .. G01S 5/0036; H04L 5/0051; H04W 68/005; H04W 76/20; H04W 4/025; H04W 68/00; H04W 76/27; H04W 64/00
See application file for complete search history.

(56) References Cited

U.S. PATENT DOCUMENTS 8,718,675 B1    5/2014 Choi et al.
9,282,428 B1 *  3/2016 Choi ................. H04W 4/02
(Continued)

FOREIGN PATENT DOCUMENTS

| CN | 104980888 A | 10/2015 |
| CN | 109150362 A | 1/2019 |
| CN | 109803224 A | 5/2019 |
| WO | 2018187223 A1 | 10/2018 |
| WO | 2019083596 A1 | 5/2019 |
| WO | 2019153215 A1 | 8/2019 |

OTHER PUBLICATIONS

3GPP TS 36.355 V15.4.0 (Jun. 2019), "3rd Generation Partnership Project; Technical Specification Group Radio Access Network; Evolved Universal Terrestrial Radio Access (E-Utra); LTE Positioning Protocol (LPP) (Release 15)," Jun. 2019, 224 pages.
(Continued)

*Primary Examiner* — Habte Mered
(74) *Attorney, Agent, or Firm* — Fish & Richardson P.C.

(57) ABSTRACT

Example methods for reporting user equipment location information and apparatus are described. In one example method, user equipment receives a first message, where the first message comprises a paging trigger indication, and the paging trigger indication is used to trigger the user equipment to report, when receiving a paging message, a measurement result of a positioning reference signal. The user equipment receives the paging message in an idle state or an inactive state. The measurement result of the positioning reference signal is reported by the user equipment based on the paging message.

17 Claims, 24 Drawing Sheets

(51) Int. Cl.
*H04W 68/00* (2009.01)
*H04W 76/20* (2018.01)

(56) References Cited

U.S. PATENT DOCUMENTS

| | | | |
|---|---|---|---|
| 11,019,487 B2* | 5/2021 | Edge | H04W 72/0473 |
| 2018/0199160 A1* | 7/2018 | Edge | H04W 4/02 |
| 2019/0182665 A1 | 6/2019 | Edge | |
| 2022/0116902 A1* | 4/2022 | Liu | H04W 4/029 |
| 2022/0312324 A1* | 9/2022 | Thangarasa | H04W 24/10 |

OTHER PUBLICATIONS

3GPP TR 38.855 V16.0.0 (Mar. 2019), "3rd Generation Partnership Project; Technical Specification Group Radio Access Network; Study on NR positioning support (Release 16)," Mar. 2019, 197 pages.

Huawei et al., "Positioning consideration in Nb-Iot," 3GPP TSG-RAN WG2 Meeting #96, R2-167820, Reno, USA, Nov. 14-18, 2016, 9 pages.

PCT International Search Report and Written Opinion issued in International Application No. PCT/CN2019/120437 on Aug. 25, 2020, 17 pages (with English translation).

Qualcomm Incorporated, "Location Services Alternatives for 5G System Architecture and 5G Procedures," SA WG2 Meeting #120, S2-171982, Busan, South Korea, Mar. 27-31, 2017, 30 pages.

Qualcomm Incorporated, "Location Services for 5G System Procedures," SA WG2 Meeting #119, S2-170821, Dubrovnik, Croatia, Feb. 13-17, 2017, 12 pages.

Xiaomi, "Positioning Enhancements On RRC Idle/Inactive UE And Latency Reduction," 3GPP TSG RAN WG2 #112, e-Meeting, R2-2009577, Nov. 2-13, 2020, 5 pages.

Supplementary European Search Report in European AppIn No. 19953412.4, dated Nov. 3, 2022, 18 pages.

* cited by examiner

USER EQUIPMENT LOCATION INFORMATION REPORTING METHOD, USER EQUIPMENT, AND NETWORK DEVICE

CROSS-REFERENCE TO RELATED APPLICATIONS

This application is a continuation of International Application No. PCT/CN2019/120437, filed on Nov. 22, 2019. The disclosure of which is hereby incorporated by reference in its entirety.

TECHNICAL FIELD

This application relates to the field of communication technologies, and in particular, to a user equipment (user equipment, UE) location information reporting method, user equipment, and a network device.

BACKGROUND

With rapid development of communication technologies, to provide a better communication service for a user, downlink high-accuracy positioning has become an important research subject of 5G technologies. For example, in an enhanced mobile broadband (enhanced Mobile Broadband, eMBB) scenario, a requirement for positioning accuracy is usually that an indoor positioning accuracy error should be less than 1 meter and an outdoor positioning accuracy error should be less than 10 meters.

In conventional downlink positioning, a location is determined by analyzing a result of measuring a reference signal by user equipment UE. For example, the reference signal may be a positioning reference signal (positioning reference signal, PRS). Specifically, the UE may periodically report a measurement result of a reference signal to a location management device.

However, in a conventional technology, the UE only in a connected (connected) state can report the measurement result to the location management device. For the UE in an idle (idle) state or an inactive (inactive) state, the user equipment UE needs to periodically enter the connected state from the idle state or the inactive state, to report the measurement result of the reference signal to the location management device. However, when the UE enters the connected state, power consumption increases.

In addition, the UE enters the connected state, and a network device needs to allocate a link resource to the UE. As a result, a waste of link resources may be further caused by using a conventional downlink locating method.

SUMMARY

This application provides a UE location information reporting method, user equipment, and a network device, to resolve a problem of excessive power consumption and a waste of link resources that are caused by a fact that UE in an idle state or an inactive state reports a measurement result of a reference signal.

To achieve the foregoing objective, the following technical solutions are used in embodiments of this application.

According to a first aspect, a user equipment location information reporting method is provided. The method includes: User equipment receives a first message, where the first message includes a paging trigger indication, and the paging trigger indication is used to trigger the user equipment to report, when receiving a paging message, a measurement result of a positioning reference signal. The user equipment in an idle state or an inactive state receives the paging message. The user equipment reports the measurement result of the positioning reference signal based on the received paging message.

In the technical solution provided in the first aspect, when receiving the paging message, the UE may report, based on the received paging trigger indication, a measurement result obtained by the UE by measuring a plurality of positioning reference signals. A location management device may determine a location of the UE based on the measurement result reported by the UE. In this manner, a problem of excessive power consumption and a waste of link resources that are caused by a fact that the UE in the idle state or the inactive state periodically enters a connected state to report the measurement result of the reference signals can be resolved.

In a possible implementation, that user equipment receives a first message includes: The user equipment receives the first message from the location management device. The location management device (such as an LMF or an LMC) indicates the UE to trigger, based on the paging message, reporting of the measurement result obtained by the UE by measuring the plurality of positioning reference signals, so that reporting of the measurement result by the UE and locating of the UE can be conveniently managed. Therefore, the method can be well applied to a technology in which the location management device manages locating of the UE in conventional technologies.

In a possible implementation, that the user equipment reports the measurement result of the positioning reference signal based on the received paging message includes: The user equipment reports the measurement result of the positioning reference signal to the location management device based on the received paging message. The UE reports, to the location management device (such as the LMF or the LMC), the measurement result obtained by the UE by measuring the plurality of positioning reference signals, so that the location management device manages locating of the UE. Therefore, the method can be well applied to the technology in which the location management device manages locating of the UE in the conventional technologies.

In a possible implementation, that the user equipment receives the paging message in an idle state or an inactive state includes: The user equipment in the idle state receives the paging message from an access network device or an access and mobility management device. Alternatively, the user equipment in the inactive state receives the paging message from an access network device. The UE location information reporting method provided in this application is applicable to a case in which the UE in the idle state or the inactive state is triggered to report the measurement result of the positioning reference signal based on the paging message. The problem of excessive power consumption and a waste of link resources that are caused by the fact that the UE in the idle state or the inactive state periodically enters the connected state to report the measurement result of the reference signals can be resolved.

In a possible implementation, the paging message includes location request indication information, and the location request indication information is used to indicate the user equipment to report the measurement result of the positioning reference signal based on the paging message. The location request indication information in the paging message is further used to indicate the UE to report the measurement result of the positioning reference signal based on the paging message. A mechanism for reporting the measurement result of the positioning reference signal by the UE can be more flexibly managed.

In a possible implementation, that the user equipment reports the measurement result of the positioning reference signal to the location management device based on the received paging message includes: The user equipment in the connected state reports the measurement result of the positioning reference signal to the location management device. Alternatively, the user equipment in the idle state or the inactive state reports the measurement result of the positioning reference signal to the location management device. In the UE location information reporting method provided in this application, the UE may report, based on the paging trigger indication, the measurement result of the positioning reference signal in any one of the connected state, the idle state, or the inactive state. The problem of excessive power consumption and a waste of link resources that are caused by the fact that the UE in the idle state or the inactive state periodically enters the connected state to report the measurement result of the reference signals can be resolved.

In a possible implementation, the measurement result of the positioning reference signal includes one or more of the following information: reference signal received power RSRP, reference signal received quality RSRQ, a reference signal time difference RSTD, narrowband reference signal received power NRSRP, or narrowband reference signal received quality NRSRQ. Specific content in the measurement result that is of the positioning reference signal used to locate the UE and that is reported by the UE is not limited in this application. For example, the specific content may be at least one of the RSRP, the RSRQ, the RSTD, the NRSRP, the NRSRQ, or the like.

In a possible implementation, the measurement result of the positioning reference signal includes a result of measuring the positioning reference signal by the user equipment in the idle state or the inactive state. The UE may report the measurement result of the positioning reference signal that is obtained by the UE through measurement based on the paging trigger indication when the UE enters the idle state or the inactive state.

In a possible implementation, the measurement result of the positioning reference signal further includes a result of measuring the positioning reference signal by the user equipment in the connected state. The UE may further report the measurement result of the positioning reference signal that is obtained by the UE in the connected state through measurement.

In a possible implementation, the location management device includes either the location management network element LMF or the location management component LMC. A structure and the like of the location management device used to manage a UE reporting mechanism and locate the UE are not limited in this embodiment of this application. For example, the location management device may be either the LMF or the LMC.

In a possible implementation, before that user equipment receives a first message, the method further includes: The user equipment sends capability information of the user equipment to the location management device. The user equipment receives assistance information from the location management device, where the capability information of the user equipment is used to indicate at least a locating mode type supported by the user equipment and/or a positioning reference signal measurement capability. The UE location information reporting method provided in this application may be implemented based on several information types in a conventional LPP protocol.

According to a second aspect, a user equipment location information reporting method is provided. The method includes: A location management device sends a first message to user equipment, where the first message includes a paging trigger indication, and the paging trigger indication is used to trigger the user equipment to report, when receiving a paging message, a measurement result of a positioning reference signal to the location management device. The location management device receives the measurement result of the positioning reference signal from the user equipment, where the user equipment is triggered to report the measurement result of the positioning reference signal to the location management device based on the received paging message.

In the technical solution provided in the second aspect, the location management device may indicate the UE to report, based on the received paging trigger indication when the UE receives the paging message, a measurement result obtained by the UE by measuring a plurality of positioning reference signals. The location management device may determine a location of the UE based on the measurement result reported by the UE. In this manner, a problem of excessive power consumption and a waste of link resources that are caused by a fact that the UE in an idle state or an inactive state periodically enters a connected state to report the measurement result of the reference signals can be resolved.

In a possible implementation, the method further includes: The location management device receives first indication information from an access and mobility management device, where the first indication information is used to indicate that the user equipment is in the idle state or the inactive state. The location management device sends second indication information to the access and mobility management device, where the second indication information is used to indicate the access and mobility management device to report a location of the user equipment in the idle state or the inactive state. The location management device may further indicate, through the access and mobility management device based on a current state of the UE sent by the access and mobility management device, the UE to report the measurement result of the positioning reference signal based on the paging message. A mechanism for reporting the measurement result of the positioning reference signal by the UE can be more flexibly managed.

In a possible implementation, the measurement result of the positioning reference signal includes one or more of the following information: reference signal received power RSRP, reference signal received quality RSRQ, a reference signal time difference RSTD, narrowband reference signal received power NRSRP, or narrowband reference signal received quality NRSRQ. Specific content in the measurement result that is of the positioning reference signal used to locate the UE and that is reported by the UE is not limited in this application. For example, the specific content may be at least one of the RSRP, the RSRQ, the RSTD, the NRSRP, the NRSRQ, or the like. The location management device may locate the UE based on one or more of the foregoing measurement results.

In a possible implementation, the location management device includes either a location management network element LMF or a location management component LMC. A structure and the like of the location management device used to manage a UE reporting mechanism and locate the UE are not limited in this embodiment of this application. For example, the location management device may be either the LMF or the LMC.

In a possible implementation, before that a location management device sends a first message to user equipment, the method further includes: The location management device receives a location service request from the access and mobility management device, where the location service request is used to request to locate the user equipment; and after that the location management device receives the measurement result of the positioning reference signal from the user equipment, the method further includes: The location management device sends a location service response to the access and mobility management device, where the location service response includes a result of locating the user equipment by the location management device. In this application, the location management device may indicate, based on the location service request initiated by the access and mobility management device, the UE to report the measurement result of the positioning reference signal based on paging. Locating scenarios for use are wider and more flexible.

In a possible implementation, the location management device autonomously sends the first message to the user equipment. In this application, the location management device may autonomously indicate the UE to report the measurement result of the positioning reference signal based on paging. Locating scenarios for use are wider and more flexible.

In a possible implementation, before that a location management device sends a first message to user equipment, the method further includes: The location management device receives capability information of the user equipment from the user equipment. The location management device sends assistance information to the user equipment, where the capability information of the user equipment is used to indicate at least a locating mode type supported by the user equipment and/or a positioning reference signal measurement capability. The UE location information reporting method provided in this application may be implemented based on several information types in a conventional LPP protocol.

According to a third aspect, a user equipment location information reporting method is provided. The method includes: An access and mobility management device detects that user equipment is in an idle state or an inactive state. The access and mobility management device sends first indication information to a location management device, where the first indication information is used to indicate that the user equipment is in the idle state or the inactive state. The access and mobility management device receives second indication information from the location management device, where the second indication information is used to indicate the access and mobility management device to report a location of the user equipment in the idle state or the inactive state.

In the technical solution provided in the third aspect, the location management device may further indicate, through the access and mobility management device based on a current state of the UE sent by the access and mobility management device, the UE to report a measurement result of a positioning reference signal based on a paging message. A mechanism for reporting the measurement result of the positioning reference signal by the UE can be more flexibly managed.

In a possible implementation, after that the access and mobility management device receives second indication information from the location management device, the method further includes: The access and mobility management device sends the paging message to the user equipment, where the paging message includes location request indication information, and the location request indication information is used to indicate the user equipment to report the measurement result of the positioning reference signal based on the paging message. The access and mobility management device may further indicate, based on an indication of the location management device, the UE to report the measurement result of the positioning reference signal based on the paging message by including the location request indication information in the paging message. The mechanism for reporting the measurement result of the positioning reference signal by the UE can be more flexibly managed.

In a possible implementation, before that the access and mobility management device sends first indication information to a location management device, the method further includes: The access and mobility management device sends a location service request to the location management device, where the location service request is used to request to locate the user equipment. The access and mobility management device receives a location service response from the location management device, where the location service response includes a result of locating the user equipment by the location management device. In this application, the access and mobility management device may request the location management device to initiate the location service request, to indicate the UE to report the measurement result of the positioning reference signal based on paging. Locating scenarios for use are wider and more flexible.

In a possible implementation, that the access and mobility management device sends a location service request to the location management device includes: The access and mobility management device sends the location service request to the location management device based on a request of a location service entity; and after that the access and mobility management device receives a location service response from the location management device, the method further includes: The access and mobility management device sends the location service response to the location service entity, where the location service response includes the result of locating the user equipment by the location management device. In this application, the access and mobility management device may request, based on the request of the location service entity, the location management device to initiate the location service request, to indicate the UE to report the measurement result of the positioning reference signal based on paging. Locating scenarios for use are wider and more flexible.

In a possible implementation, that the access and mobility management device sends a location service request to the location management device includes: The access and mobility management device autonomously sends the location service request to the location management device. In this application, the location management device may autonomously indicate the UE to report the measurement result of the positioning reference signal based on paging. Locating scenarios for use are wider and more flexible.

In a possible implementation, the location management device includes either a location management network element LMF or a location management component LMC. A structure and the like of the location management device used to manage a UE reporting mechanism and locate the UE are not limited in this embodiment of this application. For example, the location management device may be either the LMF or the LMC.

According to a fourth aspect, user equipment is provided. The user equipment includes a receiving unit, configured to: receive a first message, and receive a paging message in an idle state or an inactive state, where the first message includes a paging trigger indication, and the paging trigger indication is used to trigger the user equipment to report, when receiving the paging message, a measurement result of a positioning reference signal; and a sending unit, configured to report the measurement result of the positioning reference signal based on the received paging message.

In the technical solution provided in the fourth aspect, when receiving the paging message, the UE may report, based on the received paging trigger indication, a measurement result obtained by the UE by measuring a plurality of positioning reference signals. A location management device may determine a location of the UE based on the measurement result reported by the UE. In this manner, a problem of excessive power consumption and a waste of link resources that are caused by a fact that the UE in the idle state or the inactive state periodically enters a connected state to report the measurement result of the reference signals can be resolved.

In a possible implementation, that the receiving unit receives the first message includes: The receiving unit receives the first message from the location management device. The location management device (such as an LMF or an LMC) indicates the UE to trigger, based on the paging message, reporting of the measurement result obtained by the UE by measuring the plurality of positioning reference signals, so that reporting of the measurement result by the UE and locating of the UE can be conveniently managed. Therefore, the method can be well applied to a technology in which the location management device manages locating of the UE in conventional technologies.

In a possible implementation, that the sending unit reports the measurement result of the positioning reference signal based on the received paging message includes: The sending unit reports the measurement result of the positioning reference signal to the location management device based on the received paging message. The UE reports, to the location management device (such as the LMF or the LMC), the measurement result obtained by the UE by measuring the plurality of positioning reference signals, so that the location management device manages locating of the UE. Therefore, the method can be well applied to the technology in which the location management device manages locating of the UE in the conventional technologies.

In a possible implementation, that the receiving unit receives the paging message in the idle state or the inactive state includes: The receiving unit in the idle state receives the paging message from an access network device or an access and mobility management device. Alternatively, the receiving unit in the inactive state receives the paging message from an access network device. The UE location information reporting method provided in this application is applicable to a case in which the UE in the idle state or the inactive state is triggered to report the measurement result of the positioning reference signal based on the paging message. The problem of excessive power consumption and a waste of link resources that are caused by the fact that the UE in the idle state or the inactive state periodically enters the connected state to report the measurement result of the reference signals can be resolved.

In a possible implementation, the paging message includes location request indication information, and the location request indication information is used to indicate the user equipment to report the measurement result of the positioning reference signal based on the paging message. The location request indication information in the paging message is further used to indicate the UE to report the measurement result of the positioning reference signal based on the paging message. A mechanism for reporting the measurement result of the positioning reference signal by the UE can be more flexibly managed.

In a possible implementation, that the sending unit reports the measurement result of the positioning reference signal to the location management device based on the received paging message includes: The sending unit in the connected state reports the measurement result of the positioning reference signal to the location management device. Alternatively, the sending unit in the idle state or the inactive state reports the measurement result of the positioning reference signal to the location management device. In the UE location information reporting method provided in this application, the UE may report, based on the paging trigger indication, the measurement result of the positioning reference signal in any one of the connected state, the idle state, or the inactive state. The problem of excessive power consumption and a waste of link resources that are caused by the fact that the UE in the idle state or the inactive state periodically enters the connected state to report the measurement result of the reference signals can be resolved.

In a possible implementation, the measurement result of the positioning reference signal includes one or more of the following information: reference signal received power RSRP, reference signal received quality RSRQ, a reference signal time difference RSTD, narrowband reference signal received power NRSRP, or narrowband reference signal received quality NRSRQ. Specific content in the measurement result that is of the positioning reference signal used to locate the UE and that is reported by the UE is not limited in this application. For example, the specific content may be at least one of the RSRP, the RSRQ, the RSTD, the NRSRP, the NRSRQ, or the like.

In a possible implementation, the user equipment further includes: a measurement unit, configured to measure a plurality of positioning reference signals in the idle state or the inactive state, to obtain a measurement result of the positioning reference signals, where the measurement result of the positioning reference signals includes a result of measuring the positioning reference signals by the measurement unit in the idle state or the inactive state. The UE may report the measurement result of the positioning reference signal that is obtained by the UE through measurement based on the paging trigger indication when the UE enters the idle state or the inactive state.

In a possible implementation, the measurement unit is further configured to measure a plurality of positioning reference signals in the connected state, to obtain a measurement result of the positioning reference signals, where the measurement result of the positioning reference signals further includes a result of measuring the positioning reference signals by the measurement unit in the connected state. The UE may further report the measurement result of the positioning reference signal that is obtained by the UE in the connected state through measurement.

In a possible implementation, the location management device includes either the location management network element LMF or the location management component LMC. A structure and the like of the location management device used to manage a UE reporting mechanism and locate the UE are not limited in this embodiment of this application. For example, the location management device may be either the LMF or the LMC.

In a possible implementation, before that the receiving unit receives the first message, the receiving unit is further configured to send capability information of the user equipment to the location management device; and the receiving unit is further configured to receive assistance information from the location management device, where the capability information of the user equipment is used to indicate at least a locating mode type supported by the user equipment and/or a positioning reference signal measurement capability. The UE location information reporting method provided in this application may be implemented based on several information types in a conventional LPP protocol.

According to a fifth aspect, a location management device is provided. The location management device includes: a sending unit, configured to send a first message to user equipment, where the first message includes a paging trigger indication, and the paging trigger indication is used to trigger the user equipment to report, when receiving a paging message, a measurement result of a positioning reference signal to the location management device; and a receiving unit, configured to receive the measurement result of the positioning reference signal from the user equipment, where the user equipment is triggered to report the measurement result of the positioning reference signal to the location management device based on the received paging message.

In the technical solution provided in the fifth aspect, the location management device may indicate the UE to report, based on the received paging trigger indication when the UE receives the paging message, a measurement result obtained by the UE by measuring a plurality of positioning reference signals. The location management device may determine a location of the UE based on the measurement result reported by the UE. In this manner, a problem of excessive power consumption and a waste of link resources that are caused by a fact that the UE in an idle state or an inactive state periodically enters a connected state to report the measurement result of the reference signals can be resolved.

In a possible implementation, the receiving unit is further configured to receive first indication information from an access and mobility management device, where the first indication information is used to indicate that the user equipment is in the idle state or the inactive state; and the sending unit is further configured to send second indication information to the access and mobility management device, where the second indication information is used to indicate the access and mobility management device to report a location of the user equipment in the idle state or the inactive state. The location management device may further indicate, through the access and mobility management device based on a current state of the UE sent by the access and mobility management device, the UE to report the measurement result of the positioning reference signal based on the paging message. A mechanism for reporting the measurement result of the positioning reference signal by the UE can be more flexibly managed.

In a possible implementation, the measurement result of the positioning reference signal includes one or more of the following information: reference signal received power RSRP, reference signal received quality RSRQ, a reference signal time difference RSTD, narrowband reference signal received power NRSRP, or narrowband reference signal received quality NRSRQ. Specific content in the measurement result that is of the positioning reference signal used to locate the UE and that is reported by the UE is not limited in this application. For example, the specific content may be at least one of the RSRP, the RSRQ, the RSTD, the NRSRP, the NRSRQ, or the like. The location management device may locate the UE based on one or more of the foregoing measurement results.

In a possible implementation, the location management device includes either a location management network element LMF or a location management component LMC. A structure and the like of the location management device used to manage a UE reporting mechanism and locate the UE are not limited in this embodiment of this application. For example, the location management device may be either the LMF or the LMC.

In a possible implementation, before that the sending unit sends the first message to the user equipment, the receiving unit is further configured to receive a location service request from the access and mobility management device, where the location service request is used to request to locate the user equipment; and after that the receiving unit receives the measurement result of the positioning reference signal from the user equipment, the sending unit is further configured to send a location service response to the access and mobility management device, where the location service response includes a result of locating the user equipment by the location management device. In this application, the location management device may indicate, based on the location service request initiated by the access and mobility management device, the UE to report the measurement result of the positioning reference signal based on paging. Locating scenarios for use are wider and more flexible.

In a possible implementation, the sending unit autonomously sends the first message to the user equipment. In this application, the location management device may autonomously indicate the UE to report the measurement result of the positioning reference signal based on paging. Locating scenarios for use are wider and more flexible.

In a possible implementation, before that the sending unit sends the first message to the user equipment, the receiving unit is further configured to receive capability information of the user equipment from the user equipment; and the sending unit is further configured to send assistance information to the user equipment, where the capability information of the user equipment is used to indicate at least a locating mode type supported by the user equipment and/or a positioning reference signal measurement capability. The UE location information reporting method provided in this application may be implemented based on several information types in a conventional LPP protocol.

According to a sixth aspect, an access and mobility management device is provided. The access and mobility management device includes: a detection unit, configured to detect whether user equipment is in an idle state or an inactive state; a sending unit, configured to send first indication information to a location management device, where the first indication information is used to indicate that the user equipment is in the idle state or the inactive state; and a receiving unit, configured to receive second indication information from the location management device, where the second indication information is used to indicate the access and mobility management device to report a location of the user equipment in the idle state or the inactive state.

In the technical solution provided in the sixth aspect, the location management device may further indicate, through the access and mobility management device based on a current state of the UE sent by the access and mobility management device, the UE to report a measurement result of a positioning reference signal based on a paging message. A mechanism for reporting the measurement result of the positioning reference signal by the UE can be more flexibly managed.

In a possible implementation, after that the receiving unit receives the second indication information from the location management device, the sending unit is further configured to send the paging message to the user equipment, where the paging message includes location request indication information, and the location request indication information is used to indicate the user equipment to report the measurement result of the positioning reference signal based on the paging message. The access and mobility management device may further indicate, based on an indication of the location management device, the UE to report the measurement result of the positioning reference signal based on the paging message by including the location request indication information in the paging message. The mechanism for reporting the measurement result of the positioning reference signal by the UE can be more flexibly managed.

In a possible implementation, before that the sending unit sends the first indication information to the location management device, the sending unit is further configured to send a location service request to the location management device, where the location service request is used to request to locate the user equipment; and the receiving unit is further configured to receive a location service response from the location management device, where the location service response includes a result of locating the user equipment by the location management device. In this application, the access and mobility management device may request the location management device to initiate the location service request, to indicate the UE to report the measurement result of the positioning reference signal based on paging. Locating scenarios for use are wider and more flexible.

In a possible implementation, that the sending unit sends the location service request to the location management device includes: The sending unit sends the location service request to the location management device based on a request of a location service entity; and after that the receiving unit receives the location service response from the location management device, the sending unit is further configured to send the location service response to the location service entity, where the location service response includes the result of locating the user equipment by the location management device. In this application, the access and mobility management device may request, based on the request of the location service entity, the location management device to initiate the location service request, to indicate the UE to report the measurement result of the positioning reference signal based on paging. Locating scenarios for use are wider and more flexible.

In a possible implementation, that the sending unit sends the location service request to the location management device includes: The sending unit autonomously sends the location service request to the location management device. In this application, the location management device may autonomously indicate the UE to report the measurement result of the positioning reference signal based on paging. Locating scenarios for use are wider and more flexible.

In a possible implementation, the location management device includes either a location management network element LMF or a location management component LMC. A structure and the like of the location management device used to manage a UE reporting mechanism and locate the UE are not limited in this embodiment of this application. For example, the location management device may be either the LMF or the LMC.

According to a seventh aspect, user equipment is provided. The user equipment includes: a memory, configured to store computer program code, where the computer program code includes instructions; a radio frequency circuit, configured to send and receive a wireless signal; and a processor, configured to execute the foregoing instructions, so that the user equipment performs the user equipment location information reporting method in any possible implementation of the first aspect.

According to an eighth aspect, a location management device is provided. The location management device includes: a memory, configured to store computer program code, where the computer program code includes instructions; a radio frequency circuit, configured to send and receive a wireless signal; and a processor, configured to execute the foregoing instructions, so that the location management device performs the user equipment location information reporting method in any possible implementation of the second aspect.

According to a ninth aspect, an access and mobility management device is provided. The access and mobility management device includes: a memory, configured to store computer program code, where the computer program code includes instructions; a radio frequency circuit, configured to send and receive a wireless signal; and a processor, configured to execute the foregoing instructions, so that the access and mobility management device performs the user equipment location information reporting method in any possible implementation of the third aspect.

According to a tenth aspect, a communication system is provided. The communication system includes any plurality of network elements in any possible implementation of the fourth aspect, the fifth aspect, or the sixth aspect. The communication system is configured to implement the user equipment location information reporting method in any possible implementation of the first aspect, the second aspect, or the third aspect.

According to an eleventh aspect, a communication system is provided. The communication system includes any plurality of network elements in any possible implementation of the seventh aspect, the eighth aspect, or the ninth aspect. The communication system is configured to implement the user equipment location information reporting method in any possible implementation of the first aspect, the second aspect, or the third aspect.

According to a twelfth aspect, a computer-readable storage medium is provided. The computer-readable storage medium stores computer-executable instructions. When the computer-executable instructions are executed by a processor, the user equipment location information reporting method in any possible implementation of the first aspect, the second aspect, or the third aspect is implemented.

According to a thirteenth aspect, a chip system is provided. The chip system includes a processor and a memory. The memory stores instructions. When the instructions are executed by the processor, the user equipment location information reporting method in any possible implementation of the first aspect, the second aspect, or the third aspect is implemented. The chip system may include a chip, or may include a chip and another discrete component.

According to a fourteenth aspect, a computer program product is provided. When the computer program product runs on a computer, the user equipment location information reporting method in any possible implementation of the first aspect, the second aspect, or the third aspect is implemented.

BRIEF DESCRIPTION OF DRAWINGS

FIG. 7A-1 and FIG. 7A-2 are an interaction diagram 1 of a UE location information reporting method according to an embodiment of this application;

FIG. 7B-1 and FIG. 7B-2 are an interaction diagram 2 of a UE location information reporting method according to an embodiment of this application;

DESCRIPTION OF EMBODIMENTS

This application provides a user equipment location information reporting method. The method is applied to a process in which a location management device, an access and mobility management device, or a third-party device locates user equipment. Specifically, when receiving a paging message, the UE may report, based on an indication of the location management device (such as an LMF or an LMC), a result of measuring a plurality of received positioning reference signals by the user equipment UE. The location management device (such as the LMF or the LMC) may determine a location of the UE based on the measurement result reported by the UE.

The user equipment location information reporting method provided in this application may be applied to various communication systems, such as a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a future 5th generation (5th generation, 5G) system, or a new radio (new radio, NR) system. A 5G mobile communication system in this application includes a non-standalone (non-standalone, NSA) 5G mobile communication system or a standalone (standalone, SA) 5G mobile communication system. The technical solutions provided in this application may be further applied to a future communication system, for example, a 6th generation mobile communication system. Alternatively, the communication system may be a public land mobile network (Public Land Mobile Network, PLMN), a device-to-device (device-to-device, D2D) communication system, a machine-to-machine (machine-to-machine, M2M) communication system, an internet of things (Internet of Things, IoT) communication system, or another communication system.

Figure 1A:
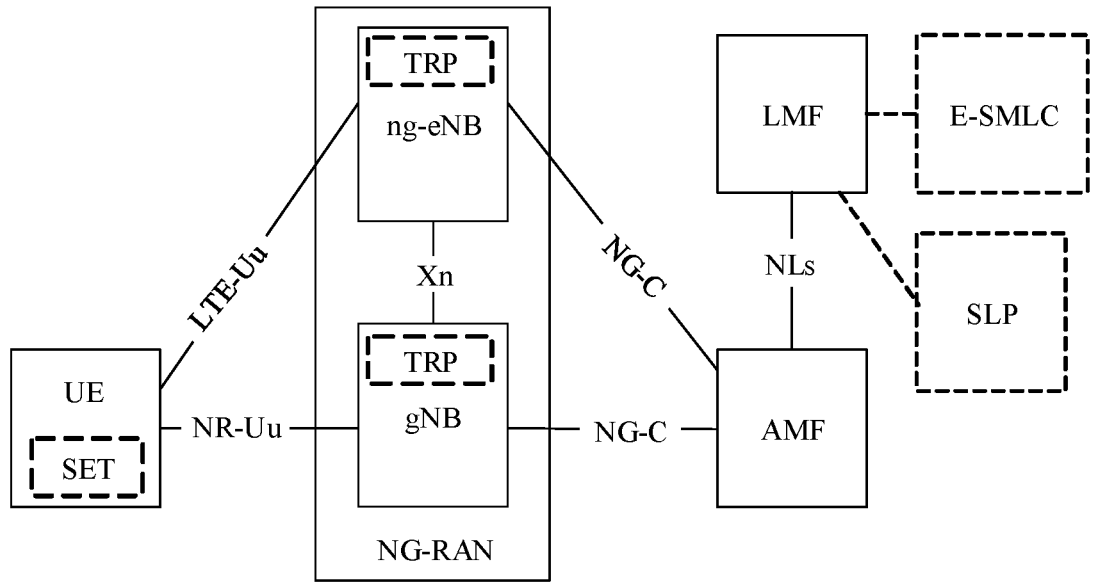
FIG. 1A(a), FIG. 1A(b), FIG. 1A(c) and FIG. 1A(d) are a schematic diagram of examples of four network architectures used to locate UE according to an embodiment of this application.
Figure 1A:
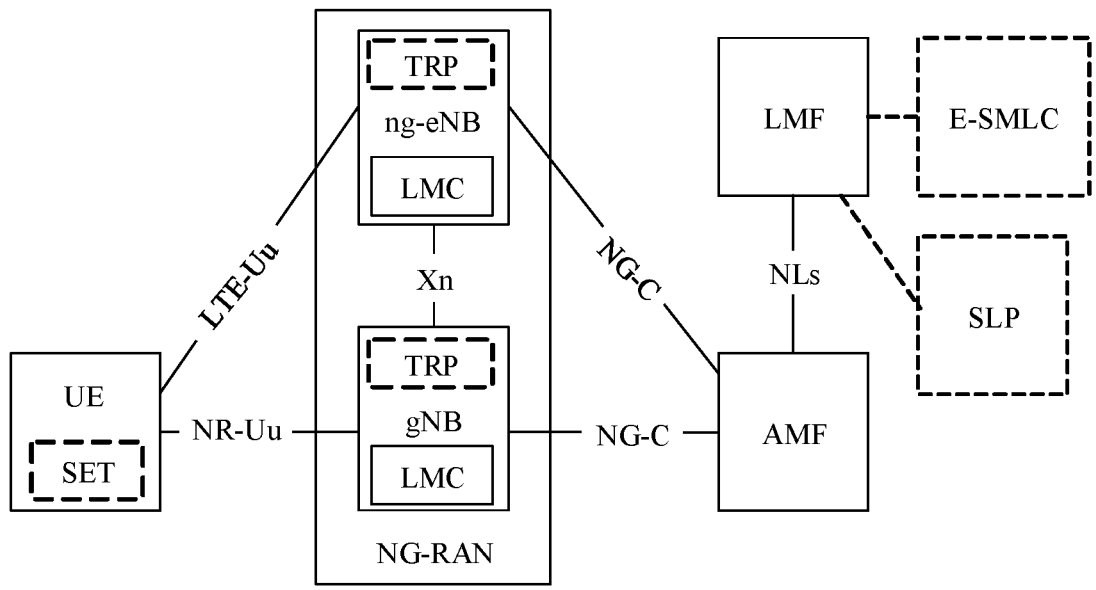
Figure 1A:
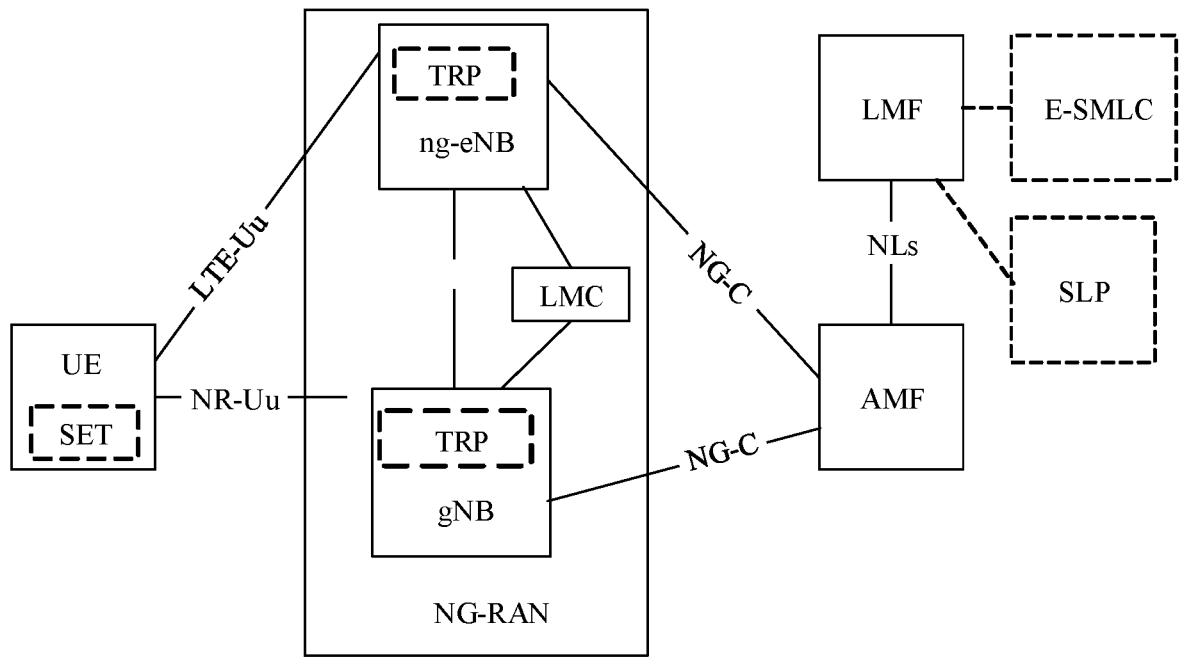
Figure 1A:
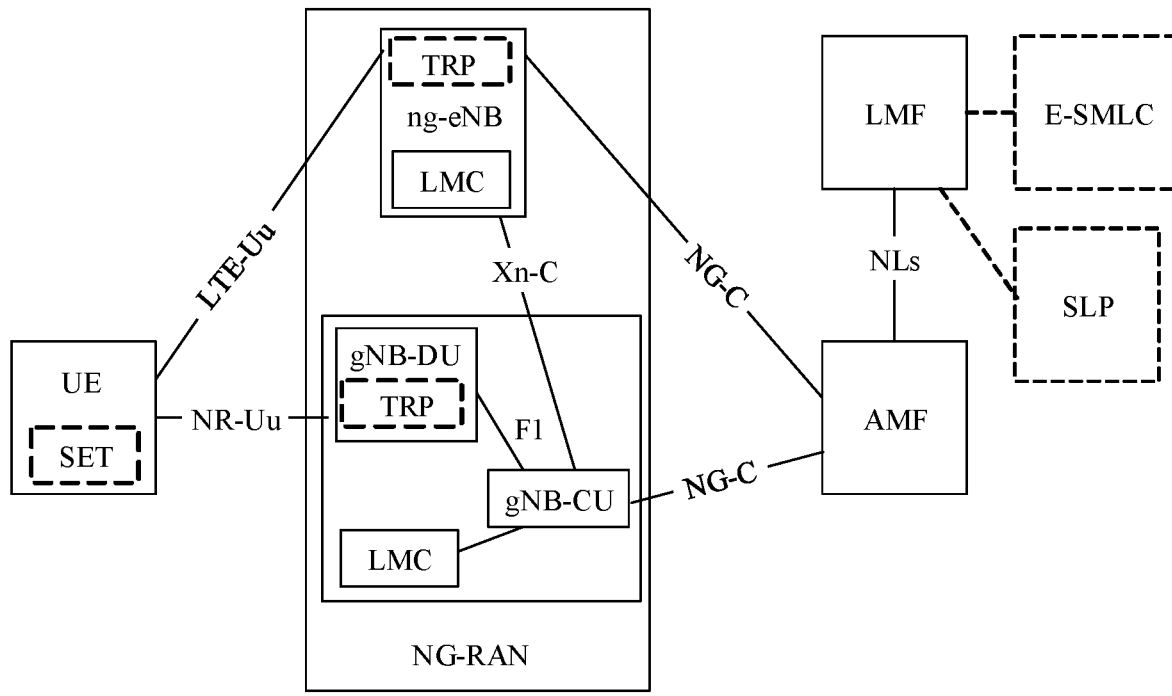

FIG. 1A(a), FIG. 1A(b), FIG. 1A(c) and FIG. 1A(d) are a schematic diagram of examples of four network architectures applicable to locating of UE. As shown in FIG. 1A(a), a terminal device is connected to an NG-RAN through an LTE-Uu interface and/or an NR-Uu interface via a next-generation eNodeB (next-generation eNodeB, ng-eNB) and/or a gNB respectively. The NG-RAN may include one or more ng-eNBs. The NG-RAN may alternatively include one or more gNBs. The NG-RAN may alternatively include one or more ng-eNBs and gNBs. The NG-RAN may further include one or more transmission reception points (transmission/reception points, TRPs). The ng-eNB is a base station in an LTE communication system. The gNB is a base station in an NR communication system. The ng-eNB communicates with the gNB through an Xn interface. The NG-RAN communicates with an access and mobility management network element (access and mobility management function, AMF) through an NG-C interface. In a UE locating process, the AMF is equivalent to a router for communication between a base station and a location management function network element (location management function, LMF), and is configured to implement a function such as access management. The LMF is configured to implement a function such as location management, including managing a reporting process of UE location information, obtaining the UE location information, and the like. The AMF communicates with the LMF through an NLs interface.

Optionally, one LMF may further have a signaling connection to an enhanced serving mobile location center (enhanced serving mobile location center, E-SMLC). The E-SMLC is a core network entity responsible for processing a location request in an E-UTRA location architecture, for example, locating specific UE and sending assistance data to UE. Therefore, the signaling connection between the LMF and the E-SMLC enables the LMF to obtain location data from an E-UTRA system.

Optionally, one LMF may also have a signaling connection to a secure user plane location platform (secure user plane location platform, SLP). The SLP is an SUPL (secure user plane location) entity responsible for locating in user plane locating. Therefore, the signaling connection between the LMF and the SLP enables the LMF to support a user plane locating solution. The SUPL is a locating protocol architecture specified in the open mobile alliance (open mobile alliance, OMA).

As shown in FIG. 1A(b), a location management component (location management component, LMC) may be further integrated into a gNB and/or an ng-eNB.

As shown in FIG. 1A(c), an LMC may be integrated into an NG-RAN independently of a gNB and an ng-eNB, and serves as a node (node) of the NG-RAN.

The LMC serving as the node (node) of the NG-RAN may implement a part of functions of an LMF. In this application, in a process in which the UE reports location information, the UE may report a measurement result of a reference signal to the LMC. The UE does not need to interact with a core network, so that signaling overheads can be reduced, and a positioning latency can be reduced. Alternatively, when the UE is in an inactive state, the LMC may include location request indication information (such as positionRequest or locationRequest) in a paging message based on an indication of the LMF.

In some possible structures, an access network device may include a central unit (central unit, CU) and a distributed unit (distributed unit, DU). The CU may also be referred to as a control unit (control unit). In this CU-DU structure, protocol layers of the access network device may be separated, where functions of some protocol layers are centrally controlled by the CU, functions of some or all of remaining protocol layers are distributed in the DU, and the CU centrally controls the DU. For example, a radio resource control (radio resource control, RRC) layer, a service data adaptation protocol (service data adaptation protocol, SDAP) layer, and a packet data convergence protocol (packet data convergence protocol, PDCP) layer may be deployed on the CU, and a radio link control (radio link control, RLC) layer, a media access control (media access control, MAC) layer, and a physical (Physical) layer are deployed on the DU. The CU and the DU are connected through an F1 interface. The CU that represents the gNB is connected to the core network through an NG interface.

Optionally, a structure in which a control plane (control plane) entity is separated from a user plane (user plane, UP) network element may alternatively be used for the CU, and one control plane network element manages a plurality of user plane network elements.

In an example, one gNB may have one gNB-CU-CP, a plurality of gNB-CU-UPs, and a plurality of gNB-DUs. One gNB-CU-CP is connected to a plurality of gNB-CU-UPs through E1 interfaces. One gNB-CU-CP may be connected to a plurality of gNB-DUs through F1-C interfaces. One gNB-DU may be connected to a plurality of gNB-CU-UPs through F1-U interfaces.

As shown in FIG. 1A(d), a gNB may include a gNB-DU and a gNB-CU. The gNB-DU is connected to the gNB-CU through an F1 interface, and the gNB-CU is connected to an ng-eNB through an Xn-C interface. An LMC is further integrated into the gNB.

It should be understood that the locating systems shown in FIG. 1A(a), in FIG. 1A(b), in FIG. 1A(c), and in FIG. 1A(d) may include one or more gNBs and one or more UEs. One gNB may transmit data or control signaling to one or more UEs. A plurality of gNBs may also transmit data or control signaling to one UE.

It should be further understood that devices or function nodes included in the locating systems shown in FIG. 1A(a), in FIG. 1A(b), in FIG. 1A(c), and in FIG. 1A(d) are merely examples for description. This constitutes no limitation on this application. Actually, the locating systems shown in FIG. 1A(a), in FIG. 1A(b), in FIG. 1A(c), and in FIG. 1A(d) may further include another network element or device or function node that has an interaction relationship with the devices or the function nodes shown in the figure. This is not specifically limited herein.

It should be further understood that, in this application, the location management device may be the LMF shown in FIG. 1A(a), in FIG. 1A(b), in FIG. 1A(c), or in FIG. 1A(d), or may be the LMC shown in FIG. 1A(b), in FIG. 1A(c), or in FIG. 1A(d). Alternatively, the location management device may be a location management unit (Location Management Unit, LMU) or another network device having a location management function. An example in which the location management device is an LMF or an LMC is merely used in FIG. 1A(a), in FIG. 1A(b), in FIG. 1A(c), and in FIG. 1A(d). The location management device is not specifically limited in this application.

The access network device in this application may be the ng-eNB, the gNB, or the TRP shown in FIG. 1A(a), in FIG. 1A(b), in FIG. 1A(c), and in FIG. 1A(d). Alternatively, the access network device may be a base station defined in the 3rd generation partnership project (3rd generation partnership project, 3GPP), for example, a base station device in an LTE system, that is, an evolved NodeB (evolved NodeB, eNB/eNodeB).

In addition, when the eNB accesses an NR core network, a next generation core (Next Generation Core, NGC) or a 5G core network (5th Generation Core Network, 5GC), the eNB may also be referred to as an eLTE eNB. Specifically, the eLTE eNB is an evolved LTE base station device based on the eNB, and may be directly connected to the 5G CN. The eLTE eNB also belongs to a base station device in NR.

Alternatively, the access network device may be a wireless terminal (wireless terminal, WT), for example, an access point (access point, AP), an access controller (access controller, AC), or another network device that has a capability of communicating with user equipment and a core network, for example, a relay device, a vehicle-mounted device, or an intelligent wearable device. A type of the access network device is not limited in this application.

Figure 1B:
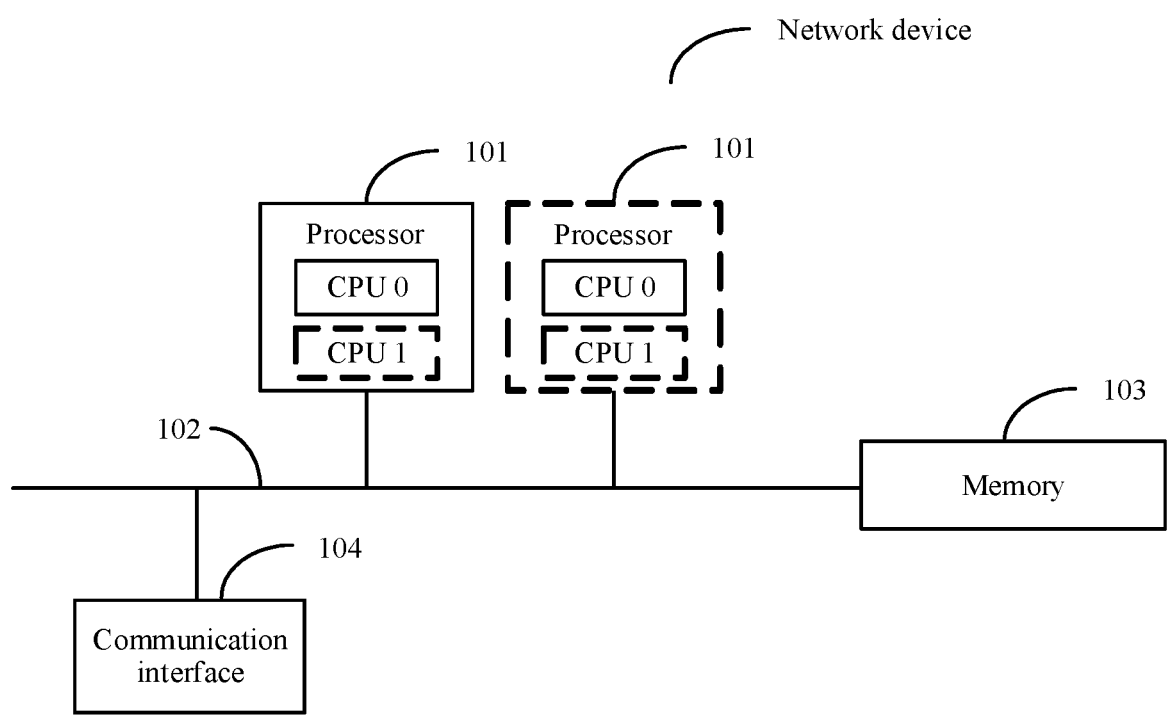
FIG. 1B is a schematic diagram of a hardware structure of a network device according to an embodiment of this application.

FIG. 1B is a schematic diagram of a hardware structure of a network device. As shown in FIG. 1B, the network device may include a processor 101, a communication line 102, a memory 103, and at least one communication interface (where FIG. 1B is described merely by using an example in which the network device includes a communication interface 104).

The processor 101 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 102 may include a path on which information is transferred between the foregoing components.

The communication interface 104 is configured to communicate with another device or a communication network such as the Ethernet, a radio access network (radio access network, RAN), or a wireless local area network (wireless local area network, WLAN) by using any apparatus such as a transceiver.

The memory 103 may be a read-only memory (read-only memory, ROM) or another type of static storage device that can store static information and instructions, or a random access memory (random access memory, RAM) or another type of dynamic storage device that can store information and instructions. The memory 103 may alternatively be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible to a computer, but is not limited thereto. The memory may exist independently, and is connected to the processor through the communication line 102. Alternatively, the memory may be integrated with the processor.

The memory 103 is configured to store computer-executable instructions for performing the solutions in this application. The memory 103 can store instructions for implementing two modular functions: a sending instruction, a receiving instruction, and a processing instruction, and the processor 101 controls execution of the instructions. The processor 101 is configured to execute the computer-executable instructions stored in the memory 103, to implement the user equipment location information reporting method provided in the following embodiments of this application. The memory 103 shown in FIG. 1B is merely a schematic diagram. The memory may further include another functional instruction. This is not limited in the present invention.

Optionally, the computer-executable instructions in this application may also be referred to as application program code. This is not specifically limited in this application.

During specific implementation, in an embodiment, the processor 101 may include one or more CPUs, for example, a CPU 0 and a CPU 1 in FIG. 1B.

It should be noted that FIG. 1B is merely used as an example of the network device, and a specific structure of the network device is not limited. For example, the network device may further include another function module. In addition, the access network device (such as an access network device) and the core network device (such as a location management device, an access and mobility management device, or a location service entity) in this application each may have a hardware structure that is the same as or similar to that in FIG. 1B.

The UE in this application may be a desktop device, a laptop device, a handheld device, a wearable device, a smart home device, a computing device, a vehicle-mounted device, or the like having a wireless connection function, for example, a netbook, a tablet computer, a smartwatch, an ultra-mobile personal computer (ultra-mobile personal computer, UMPC), a smart camera, the netbook, a personal digital assistant (Personal Digital Assistant, PDA), a portable multimedia player (portable multimedia player, PMP), an AR (augmented reality) device/a VR (virtual reality) device, a wireless device on a flight vehicle, a wireless device on a robot, a wireless device in industrial control, a wireless device in telemedicine, a wireless device in a smart grid, a wireless device in a smart city (smart city), or a wireless device in a smart home (smart home). Alternatively, the user equipment may be a wireless device or the like in a narrowband (narrowband, NB) technology.

The user equipment UE in this application may alternatively be an access terminal, a subscriber unit, a subscriber station, a mobile station, a relay station, a remote station, a remote terminal, a mobile device, a user terminal (user terminal), user equipment (user equipment, UE), a terminal (terminal), a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), a terminal device in a future internet of vehicles, or the like. A specific type, a structure, and the like of the user equipment UE are not limited in this application.

In addition, the terminal device in this application may alternatively be a terminal device in an IoT system. The IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrowband (narrowband, NB) technology.

In addition, in this application, the terminal device may further include a sensor, for example, an intelligent printer, a train detector, or a gas station. Main functions of the terminal device include: collecting data (for some terminal devices), receiving control information and downlink data of an access network device, sending electromagnetic waves, and transmitting uplink data to the access network device.

Figure 2:
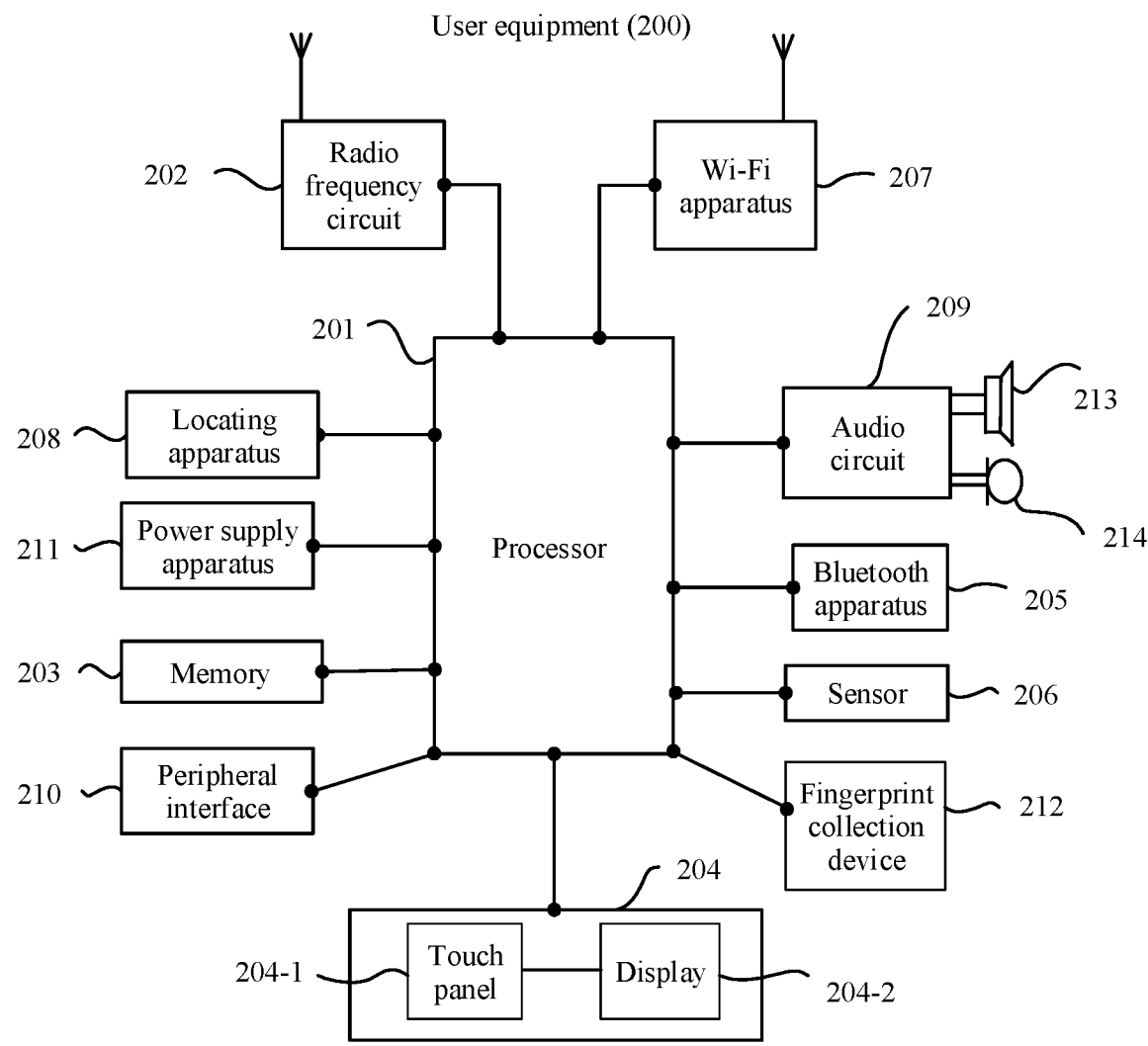
FIG. 2 is a schematic diagram of a hardware structure of UE according to an embodiment of this application.

FIG. 2 is a schematic diagram of a hardware structure of UE. As shown in FIG. 2, the user equipment 200 may specifically include components such as a processor 201, a radio frequency (RF) circuit 202, a memory 203, a touchscreen 204, a Bluetooth apparatus 205, one or more sensors 206, a Wi-Fi apparatus 207, a locating apparatus 208, an audio circuit 209, a peripheral interface 210, and a power supply system 211. These components may perform communication by using one or more communication buses or signal lines (not shown in FIG. 2). A person skilled in the art may understand that the hardware structure shown in FIG. 2 does not constitute a limitation on the user equipment 200, and the user equipment 200 may include more or fewer components than those shown in the figure, or may combine some components, or may have different component arrangements.

The following describes each component of the user equipment 200 in detail with reference to FIG. 2.

The processor 201 is a control center of the user equipment 200, is connected to all components of the user equipment 200 by using various interfaces and lines, and performs various functions of the user equipment 200 and data processing by running or executing an application client-side program (which may be referred to as an App for short below) stored in the memory 203 and by invoking data stored in the memory 203. In some embodiments, the processor 201 may be a general-purpose central processing unit (central processing unit, CPU), a microprocessor, an application-specific integrated circuit (application-specific integrated circuit, ASIC), or one or more integrated circuits configured to control program execution of the solutions in this application. The processor 201 may include one or more CPUs. For example, the processor 201 may be a Kirin 260 chip.

The radio frequency circuit 202 may be configured to send and receive a radio signal in an information receiving and sending process or a call process. Particularly, after receiving downlink data from a base station, the radio frequency circuit 202 may send the downlink data to the processor 201 for processing, and send uplink data to the base station. The radio frequency circuit usually includes but is not limited to an antenna, at least one amplifier, a transceiver, a coupler, a low noise amplifier, a duplexer, and the like. In addition, the radio frequency circuit 202 may further communicate with another device through wireless communication. The wireless communication may use any communication standard or protocol, including but not limited to a global system for mobile communications, a general packet radio service, code division multiple access, wideband code division multiple access, long term evolution, an e-mail message, an SMS message service, and the like.

The memory 203 is configured to store an application program and data. The memory 203 may be a read-only memory (read-only memory, ROM) or another type of static storage device that can store static information and instructions, or a random access memory (random access memory, RAM) or another type of dynamic storage device that can store information and instructions. The memory 203 may alternatively be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible to a computer, but is not limited thereto. The processor 201 performs various functions of the user equipment 200 and data processing by running the application program and the data that are stored in the memory 203. The memory 203 mainly includes a program storage area and a data storage area. The program storage area may store an operating system, and an application program required by at least one function (such as an audio playing function and an image playing function). The data storage area may store data (such as audio data and a phone book) created based on use of the user equipment 200. The memory 203 may store instructions for implementing two modular functions: a receiving instruction and a connection instruction, and the processor 201 controls execution of the instructions. The processor 201 is configured to execute the computer-executable instructions stored in the memory 203, to implement the user equipment location information reporting methods provided in the following embodiments of this application. In addition, the memory 203 may include a high-speed random access memory, and may further include a nonvolatile memory such as a magnetic disk storage device and a flash memory, or another volatile solid-state storage device. The memory 203 may store various operating systems, for example, an iOS operating system and an Android operating system.

The user equipment 200 may further include at least one sensor 206, such as a light sensor, a movement sensor, and another sensor. Specifically, the light sensor may include an ambient light sensor and a proximity sensor. The ambient light sensor may adjust luminance of a display of the touchscreen 204 based on brightness of ambient light, and the proximity sensor may turn off the display when the user equipment 200 moves to an ear. As a type of movement sensor, an accelerometer sensor may detect a value of acceleration in each direction (usually on three axes), may detect a value and a direction of gravity in a stationary state, and may be used in an application for identifying a smartphone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, and an infrared sensor may be further configured in the user equipment 200. Details are not described herein.

The locating apparatus 208 is configured to provide a geographical location for the user equipment 200. It may be understood that the locating apparatus 208 may be specifically a receiver of a locating system such as a global positioning system (GPS), a BeiDou navigation satellite system, or a Russian GLONASS. After receiving a geographical location sent by the positioning system mentioned above, the locating apparatus 208 sends the information to the processor 201 for processing, or sends the information to the memory 203 for storage. In some other embodiments, the locating apparatus 208 may alternatively be a receiver of an assisted global positioning system (AGPS). The AGPS system serves as an assisted server to assist the locating apparatus 208 in completing ranging and locating services. In this case, the assisted locating server may communicate with the locating apparatus 208 (namely, the GPS receiver) of the user equipment 200 through a wireless communication network, and provide locating assistance. In some other embodiments, the locating apparatus 208 may alternatively be a locating technology based on a Wi-Fi access point. Each Wi-Fi access point has a globally unique MAC address, and the user equipment may scan and collect a broadcast signal of a surrounding Wi-Fi access point when Wi-Fi is enabled. Therefore, the user equipment may obtain a MAC address broadcast by the Wi-Fi access point. The user equipment sends, through the wireless communication network, such data (such as the MAC address) that can identify the Wi-Fi access point to a location server. The location server retrieves a geographical location of each Wi-Fi access point, calculates a geographical location of the user equipment with reference to strength of the Wi-Fi broadcast signal, and sends the geographical location of the user equipment to the locating apparatus 208 of the user equipment.

Although not shown in FIG. 2, the user equipment 200 may further include a camera (a front-facing camera and/or a rear-facing camera), a flash, a micro projection apparatus, a near field communication (NFC) apparatus, and the like. Details are not described herein.

It should be understood that the hardware modules included in the user equipment shown in FIG. 2 are merely examples for description, and constitute no limitation on this application. Actually, the user equipment shown in FIG. 2 may further include another hardware module that has an interaction relationship with the hardware modules shown in the figure. This is not specifically limited herein.

For ease of understanding, concepts and terms that may appear in this application are explained below.

1. A connected (connected) state is also referred to as a connected mode. The connected state means that a radio resource control (radio resource control, RRC) connection has been set up, and therefore is also referred to as RRC_CONNECTED. When UE is in the connected state, a connection between the UE and an access network (such as a base station) and a connection between the UE and a core network (such as an AMF) are set up. If data needs to be transmitted, data transmission may be directly completed through the connections that are set up. The RRC connection is used to process a control plane message between the UE and the access network.
2. An inactive (inactive) state is also referred to as an inactive (RRC_INACTIVE) mode or a third state. The inactive state means that an RRC connection between the UE and the access network (such as the base station) is broken, but a connection between the access network (such as the base station) of the UE and the core network (such as the AMF) is not broken. When the UE is in the inactive state, if data needs to be transmitted, the connection between the UE and the access network (such as the base station) needs to be recovered before data transmission can be performed.
3. An idle (idle) state is also referred to as an idle (RRC_IDLE) mode. The idle state means that an RRC connection between the UE and the access network (such as the base station) is not set up, and a connection between the access network (such as the base station) of the UE and the core network (such as the AMF) is not set up. When the UE is in the idle state, if data needs to be transmitted, the connection between the UE and the access network (such as the base station) and the connection between the access network (such as the base station) of the UE and the core network (such as the AMF) need to be set up before data transmission can be performed.

Figure 3:
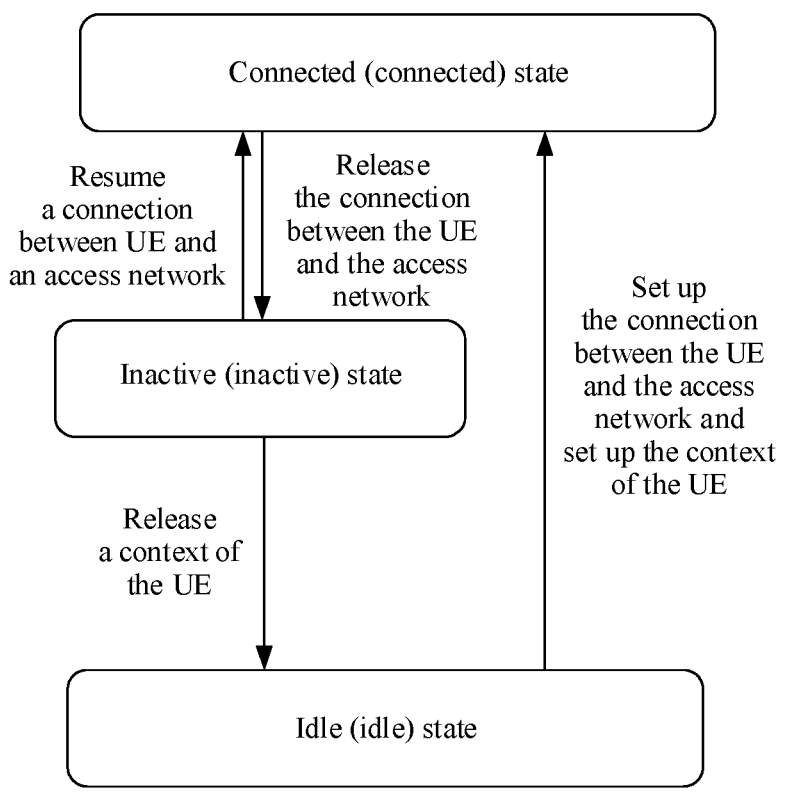
FIG. 3 is a schematic diagram of state switching between a connected state, an inactive state, and an idle state according to an embodiment of this application.

FIG. 3 is a schematic diagram of state switching of a connected (connected) state, an inactive (inactive) state, and an idle (idle) state. As shown in FIG. 3, when UE enters the connected state from the idle state, a connection between the UE and an access network device needs to be set up, and a context of the UE needs to be set up. When the UE enters the inactive state from the connected state, the connection between the UE and the access network device of the UE is broken, and a connection between the access network device of the UE and a core network device continues to be maintained. When the UE enters the idle state from the inactive state, the context of the UE is released. For specific descriptions of the idle state, the inactive state, and the connected state, refer to explanations and descriptions in a conventional technology. Details are not described in this application.

4. Tracking area (tracking area, TA): The TA is a core network level (Core Network level, CN level) location area, and is used by a system such as an LTE/SAE system to manage a location of the UE. Specifically, the TA may be used by the core network device to manage paging and location update of the UE. The UE may notify, through TA registration, the core network device of the TA in which the UE is located, so that the core network device pages the UE based on the TA with which the UE is registered when the core network device needs to page the UE.

The TA is a cell-level configuration. A same TA may be configured for a plurality of cells, but one cell belongs to only one TA at a moment.

Figure 4:
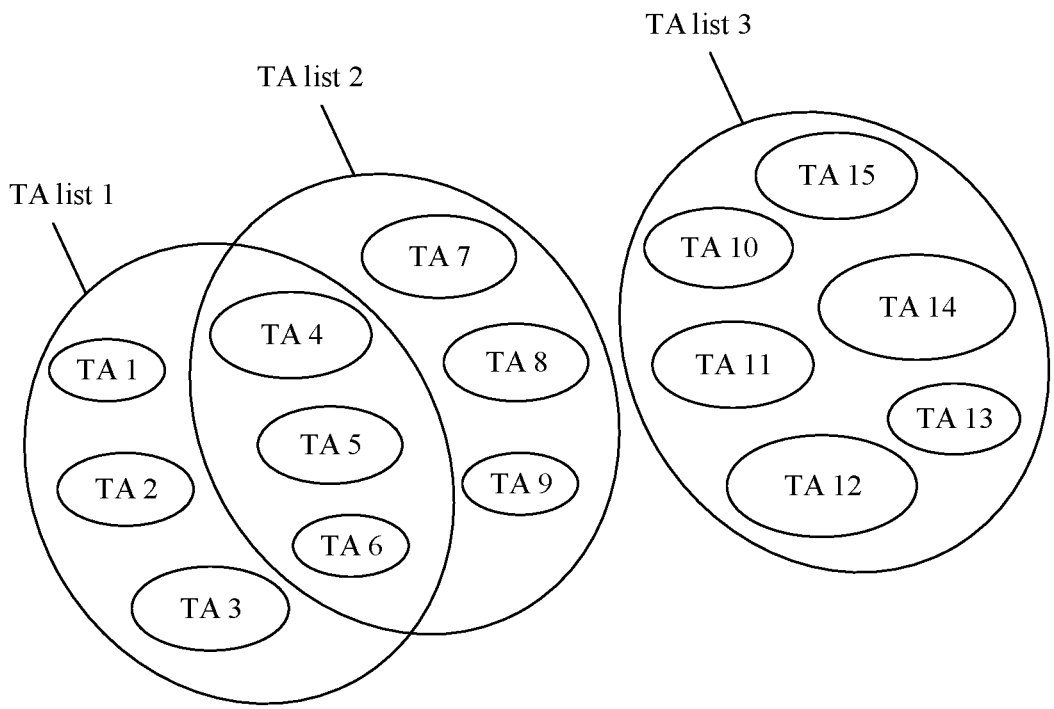
FIG. 4 is a schematic diagram of TA planning according to an embodiment of this application.

5. TA identifier: The TA identifier is used to identify a TA. For example, in LTE, the TA identifier is a TAI. TAI=PLMN+TAC. The PLMN is a public land mobile network (public land mobile network), and the TAC is a tracking area code (tracking area code).
6. TA list: A plurality of TAs form a TA list (TA List). Different TA lists may have a same TA. FIG. 4 is a schematic diagram of TA planning. As shown in FIG. 4, a TA list 1 includes a TA 1, a TA 2, a TA 3, a TA 4, a TA 5, and a TA 6. A TA list 2 includes the TA 4, the TA 5, the TA 6, a TA 7, a TA 8, and a TA 9. A TA list 3 includes a TA 10, a TA 11, a TA 12, a TA 13, a TA 14, and a TA 15. Both the TA list 1 and the TA list 2 include the TA 4, the TA 5, and the TA 6.
7. TA update (TA Update, TAU): When the UE moves from a TA area corresponding to a TA list to a TA area that is not in a TA list with which the UE is registered, TAU is performed, so that the core network device reallocates a TA list to the UE. If the core network device allocates the TA list (the TA list 1 shown in FIG. 4) to the UE, the UE does not need to perform TAU when moving in an area corresponding to the TA list 1, to reduce frequent interaction with the core network device. For example, the core network device allocates the TA list 1 to the UE. When the UE moves from the TA 1 to the TA 7 shown in FIG. 4, the UE needs to perform TAU, so that the core network device reallocates the TA list 2 to the UE. When the UE moves from the TA 1 to the TA 3 shown in FIG. 4, the UE does not need to perform TAU.
8. Access network-based notification area (RAN-Based Notification Area, RNA): Similar to the TA, the RNA is used by a network device to manage paging and location update of the UE. A difference is that the RNA is an access network level (Radio Access Network level, RAN level) location area. Before the UE enters the inactive state, the last serving base station configures an RNA for the UE. When moving within a range of the RNA, the UE does not need to perform RNA update (RNA update, RNAU). If the UE is out of the range of the RNA, the UE initiates the RNAU.

In some cases, the UE may further periodically perform TAU/RNAU, so that the network device learns of a location of the UE. In this way, the network device pages the UE based on the TA/RNA with which the UE is registered when the network device needs to page the UE.

9. Paging (Paging): When the UE is in the idle state or the inactive state, if data or a voice needs to be sent to the UE on a network side, the network device pages the UE. Specifically, the network device sends a paging message. After receiving the paging message, the UE sets up a connection to a base station, to perform data or voice transmission. Paging (Paging) may be initiated by a core network (core network, CN) and is referred to as CN paging; or may be initiated by an access network (such as a base station) and is referred to as RAN paging.

CN paging is TA-based paging. CN paging is usually initiated by an AMF. FIG. 3 is a schematic flowchart of CN paging. Specifically, an AMF sends a paging message to all access network devices (such as base stations) in an area corresponding to a TA list allocated by a network device to UE. These base stations then transparently transmit the paging message to all UEs associated with related cells of the base stations. UE that detects the paging message accesses the network device when determining that the paging message is a paging message specific to the UE. If the paging message is not a paging message specific to the UE, the UE ignores the paging message.

RAN paging is RNA-based paging. RAN paging is usually initiated by an access network device (such as a base station). The base station that initiates paging is usually the last serving base station before the UE enters the inactive state from the connected state. FIG. 4 is a schematic flowchart of RAN paging. UE in an inactive state is unaware of a core network device (such as an AMF). For the AMF, the UE is still in a connected state. Therefore, when there is a data or voice transmission requirement, the AMF still sends data or a voice to the last serving base station of the UE. If the last serving base station cannot find the UE, the last serving base station sends a paging message to all base stations in a RANAC list of the UE. These base stations then transparently transmit the paging message to all UEs associated with related cells of the base stations. UE that detects the paging message initiates an RRC resume request to set up a connection to an access network device when determining that the paging message is a paging message specific to the UE. If the paging message is not a paging message specific to the UE, the UE ignores the paging message.

In this application, UE having the hardware structure shown in FIG. 2 is used as an example to describe a UE location information reporting method provided in this application.

Figure 5:
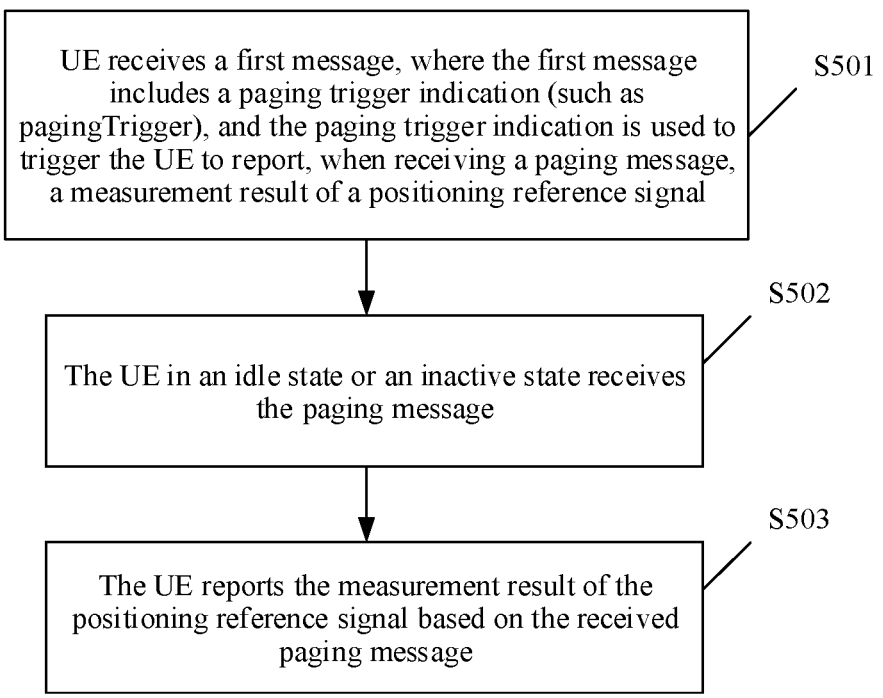
FIG. 5 is a flowchart of a UE location information reporting method according to an embodiment of this application.

As shown in FIG. 5, a UE location information reporting method provided in an embodiment of this application may include S501 to S503.

S501: UE receives a first message. The first message includes a paging trigger indication (such as pagingTrigger). The paging trigger indication is used to trigger the UE to report, when receiving a paging message, a measurement result of a positioning reference signal.

The measurement result of the positioning reference signal is used to locate the UE. Specific descriptions of the measurement result of the positioning reference signal are provided in S503 below.

In this embodiment of this application, the UE may receive the first message from an LMF. The UE may alternatively receive the first message from a device that has a location management function, such as an LMC or an LMU. A source of the first message is not specifically limited in this embodiment of this application.

For example, the first message may be a request location message. The request location message may be autonomously triggered by a location management device such as the LMF/LMC/LMU, or may be triggered by the location management device such as the LMF/LMC/LMU based on a request of an access and mobility management device (such as an AMF) or a location service entity (location service entity, LCS entity). An entity that triggers the location management device to send the request location message is not limited in this embodiment of this application.

Further, the first message may further include at least one of a periodical reporting indication, a preset time period reporting indication (Reportingduration), or a serving cell change trigger indication (Cellchange). The periodical reporting indication is used to indicate the UE to periodically report the measurement result of the positioning reference signal. The preset time period reporting indication is used to indicate the UE to report the measurement result of the positioning reference signal in a preset time period. The serving cell change trigger indication (Cellchange) is used to trigger the UE to report, when a primary serving cell changes, the measurement result of the positioning reference signal.

S502: The UE in an idle state or an inactive state receives the paging message.

If the UE is in the idle state, the UE receives the paging message from an access network device (such as an ng-eNB, a gNB, or a TRP).

If the UE is in the inactive state, the UE may receive the paging message from an access network device (such as an ng-eNB, a gNB, or a TRP), or may receive the paging message from the access and mobility management device (such as the AMF).

The paging message from the access and mobility management device (such as the AMF) is TA-based paging. Specifically, the AMF sends the paging message to all base stations (such as ng-eNBs, gNBs, or TRPs) in an area corresponding to a TA list allocated by a network device to the UE. These base stations then transparently transmit the paging message to all UEs associated with related cells of the base stations. UE that detects the paging message accesses an NG-RAN when determining that the paging message is a paging message specific to the UE. If the paging message is not a paging message specific to the UE, the UE ignores the paging message.

The paging message from the access network device (such as the ng-eNB, the gNB, or the TRP) is RNA-based paging. It may be understood that a connection between the UE in the inactive state and the access network device (such as the ng-eNB, the gNB, or the TRP) is broken, but a connection between the access network device of the UE and the access and mobility management device (such as the AMF) is normal. As a result, when there is a data transmission requirement, the access and mobility management device (such as the AMF) is unaware of the inactive state of the UE, and therefore normally sends data to the last serving base station of the UE in the connected state. However, because an RRC connection between the UE and the last serving base station is broken, the last serving base station sends a paging message to all base stations (ng-eNBs or gNBs) in a RANAC list of the UE. These base stations then transparently transmit the paging message to all UEs associated with related cells of the base stations. UE that detects the paging message initiates an RRC resume request to set up a connection to the NG-RAN when determining that the paging message is a paging message specific to the UE. If the paging message is not a paging message specific to the UE, the UE ignores the paging message.

Further, the paging message may include location request indication information (such as positionRequest or locationRequest). The location request indication information is used to indicate the UE to report the measurement result of the positioning reference signal.

The location request indication information may be included in the paging message by the access and mobility management device (such as the AMF) based on the detected UE in the idle state or the inactive state.

Alternatively, when the request location message is autonomously triggered by the location management device (such as the LMF or the LMC), the location request indication information may be included in the paging message by the access and mobility management device (such as the AMF) based on an indication of the location management device (such as the LMF). Specifically, when determining that the UE is in the idle state or the inactive state, the access and mobility management device (such as the AMF) may send, to the location management device (such as the LMF), first indication information used to indicate that the UE is in the idle state or the inactive state. The location management device (such as the LMF) may send, to the access and mobility management device (such as the AMF) based on the received first indication information, second indication information used to indicate the access and mobility management device (such as the AMF) to report a location of the UE in the idle state or the inactive state. After receiving the second indication information, the access and mobility management device (such as the AMF) may send, to the UE, the paging message or another message that carries the location request indication information (such as positionRequest or locationRequest), to further indicate the UE to report the measurement result of the positioning reference signal.

S503: The UE reports the measurement result of the positioning reference signal based on the received paging message.

The UE may report the measurement result of the positioning reference signal to the LMF. The UE may alternatively report the measurement result of the positioning reference signal to a network element such as the LMC or the LMU. Specifically, if the UE receives the first message (such as the request location message) from the LMF in step S501, the UE reports the measurement result of the positioning reference signal to the LMF. If the UE receives the first message from the LMC in S501, the UE reports the measurement result of the positioning reference signal to the LMC. If the UE receives the first message from the LMU in S501, the UE reports the measurement result of the positioning reference signal to the LMU.

In this embodiment of this application, the measurement result of the positioning reference signal that is reported by the UE may further include a measurement result obtained by the UE by measuring a plurality of positioning reference signals after the UE receives the paging message.

Optionally, the measurement result of the positioning reference signal that is reported by the UE may further include a measurement result obtained by the UE by measuring a plurality of positioning reference signals before the UE receives the paging message. For example, the UE may periodically measure a plurality of positioning reference signals based on a preset measurement periodicity, and store a measurement result of the positioning reference signals. Alternatively, the UE may measure a plurality of positioning reference signals in a preset time period, and store a measurement result of the positioning reference signals.

The measurement result of the positioning reference signal (positioning reference signal, PRS) may include but is not limited to one or more of reference signal received power (reference signal received power, RSRP), reference signal received quality (reference signal received quality, RSRQ), a reference signal time difference (reference signal time difference, RSTD), narrowband reference signal received power (narrowband reference signal reception power, NRSRP), or narrowband reference signal received quality (narrowband reference signal reception quality, NRSRQ).

Optionally, the measurement result of the positioning reference signal may further include location calculation information (such as position estimate) of the UE calculated by the UE based on the positioning reference signal. The location management device (such as the LMF or the LMC) may further calculate, based on the location calculation information (such as position estimate) reported by the UE, a result of locating the UE, or may directly use the location calculation information (such as position estimate) reported by the UE as a result of locating the UE.

It should be noted that in this embodiment of this application, an example in which the UE reports the measurement result of the PRS when receiving the paging message is merely used. Actually, the UE may further measure a positioning-related reference signal such as a sounding reference signal (sounding reference signal, SRS), channel state information (channel state information, CSI), or a synchronization signal and physical broadcast channel block (synchronization signal and physical broadcast channel block, SSB), and report measurement information used to locate the UE, for example, a measurement result of the SRS, a measurement result of the CSI, or a measurement result of the SSB when receiving the paging message. A measurement manner used by the UE and specific content of the measurement result reported by the UE are not limited in this embodiment of this application.

Further, if the UE in the idle state receives the paging message, step S503 may include the following step (1) or (2).

(1): The UE in the idle state reports the measurement result of the positioning reference signal based on the received paging message.

For example, the UE in the idle state may report the measurement result of the positioning reference signal based on early data transmission (early data transmission, EDT) and the received paging message.

Alternatively, the UE in the idle state may report the measurement result of the positioning reference signal based on the received paging message by using a preconfigured resource in the idle state. The preconfigured resource may be broadcast by using a system message, or may be delivered by using RRC dedicated signaling. Alternatively, the UE may report the measurement result of the positioning reference signal in another early data transmission manner or by using another transmission resource in the idle state. A method used by the UE in the idle state to report the measurement result of the positioning reference signal is not specifically limited in this embodiment of this application.

(2): The UE enters the connected state from the idle state. Specifically, the UE may enter the connected state from the idle state based on the received paging message, and then the UE in the connected state reports the measurement result of the positioning reference signal. In other words, the UE enters the connected state based on the received paging message and reports the measurement result.

In another optional implementation, when the location management device (such as the LMC) is located in an NG-RAN node (node) (as shown in FIG. 1A(b), in FIG. 1A(c), or in FIG. 1A(d)), the UE enters the connected state by initiating random access, and indicates, to the access network device (such as the ng-eNB, the gNB, or the TRP) by using an RRC connection setup complete (RRCSetupComplete) message, that the UE has an available location measurement result. The access network device (such as the ng-eNB, the gNB, or the TRP) requests the location measurement result from the UE based on a received indication from the UE. Then, the UE sends the measurement result of the positioning reference signal to the access network device (such as the ng-eNB, the gNB, or the TRP). The access network device (such as the ng-eNB, the gNB, or the TRP) then forwards the location measurement result to the location management device (such as the LMC).

That the UE enters the connected state from the idle state based on the received paging message may specifically include: The UE in the idle state sets up an RRC connection to the access network device (such as the ng-eNB, the gNB, or the TRP) of the UE based on the received paging message. The UE sets up a connection to the access and mobility management device (such as the AMF) through the access network device (such as the ng-eNB, the gNB, or the TRP) of the UE.

Optionally, if the UE in the inactive state receives the paging message, step S503 may include the following step (i) or (ii).

(i): The UE in the inactive state reports the measurement result of the positioning reference signal based on the received paging message.

For example, the UE in the idle state may report the measurement result of the positioning reference signal based on early data transmission (early data transmission, EDT) and the received paging message.

Alternatively, the UE in the inactive state may report the measurement result of the positioning reference signal based on the received paging message by using a preconfigured resource in the inactive state. The preconfigured resource may be broadcast by using a system message, or may be delivered by using RRC dedicated signaling. Alternatively, the UE may report the measurement result of the positioning reference signal in another early data transmission manner or by using another transmission resource in the inactive state. A method used by the UE in the inactive state to report the measurement result of the positioning reference signal is not specifically limited in this embodiment of this application.

(ii): The UE enters the connected state from the inactive state. Specifically, the UE may enter the connected state from the inactive state based on the received paging message, and then the UE in the connected state reports the measurement result of the positioning reference signal. In other words, the UE enters the connected state based on the received paging message and reports the measurement result.

That the UE enters the connected state from the inactive state based on the received paging message may specifically include: The UE in the inactive state sets up an RRC connection to the access network device (such as the ng-eNB, the gNB, or the TRP) based on the received paging message.

It should be understood that the UE location information reporting method provided in this embodiment of this application may be performed based on a long term evolution positioning protocol (long term evolution position protocol, LPP) or a positioning protocol of another 5G communication system.

Information exchanged in the LPP-based UE location information reporting method may mainly include (a) to (f).

(a) A request capability (request capabilities) is mainly used by the location management device (such as the LMF) to request capability information of the UE from the UE.

The capability information of the UE is used to indicate at least a locating mode type supported by the UE and/or a positioning reference signal measurement capability.

For example, the locating mode type supported by the UE may include but is not limited to one or more of a PRS-based locating mode, a SRS-based locating mode, a CSI-based locating mode, or an SSB-based locating mode.

The positioning reference signal measurement capability of the UE may include but is not limited to information types that may be obtained by the UE by measuring the positioning reference signal in different locating modes. For example, the positioning reference signal measurement capability of the UE may include: The UE may obtain, but not limited to, capability indication information of one or more of the RSRP, the RSRQ, the RSTD, the NRSRP, or the NRSRQ by measuring the PRS. Further, for UE with a strong computing capability, the positioning reference signal measurement capability of the UE may include: The UE may obtain capability indication information of preliminary location information of the UE through calculation by measuring the positioning reference signal.

(b) A provide capability (Provide Capabilities) is mainly used by the UE to provide the capability information of the UE to the location management device (such as the LMF).

(c) Request assistance data (Request Assistance Data) is mainly used by the UE to request assistance information from the location management device (such as the LMF).

The assistance information may include but is not limited to one or more of cell indexes of a neighboring cell and a reference cell, a PRS configuration, or the like. For example, the PRS configuration may include a preset measurement periodicity of the PRS or a preset time period of the PRS.

(d) Provide assistance data (Provide Assistance Data) is mainly used by the location management device (such as the LMF) to provide the assistance information for the UE.

(e) Request location information (Request Location Information) is mainly used by the location management device (such as the LMF) to request location information from the UE.

(f) Provide location information (Provide Location Information) is mainly used by the UE to provide the location information for the location management device (such as the LMF).

Figure 6:
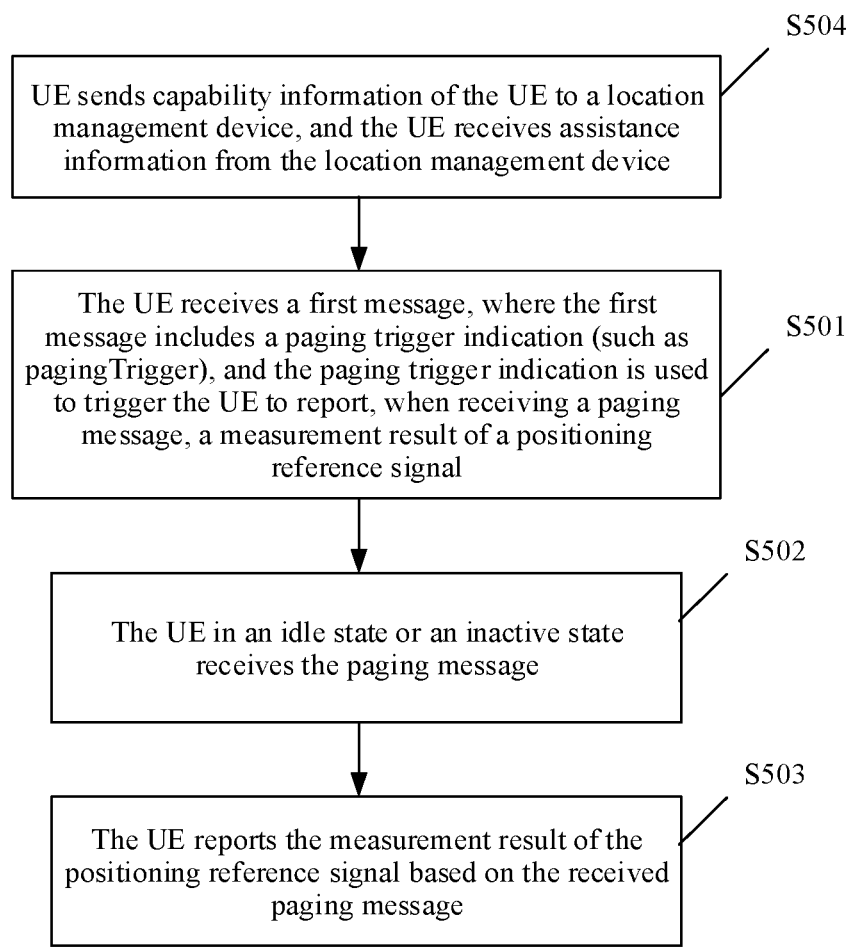
FIG. 6 is a flowchart of another UE location information reporting method according to an embodiment of this application.

Further, as shown in FIG. 6, before S501, the user equipment location information reporting method provided in this embodiment of this application may further include the following step:

S504: The UE sends the capability information of the UE to the location management device. The UE receives the assistance information from the location management device.

It may be understood that in this embodiment of this application, the UE may report, based on an indication of the location management device (such as the LMF or the LMC), the measurement result obtained by the UE by measuring the plurality of positioning reference signals when receiving the paging message. The location management device (such as the LMF or the LMC) may determine the location of the UE based on the measurement result reported by the UE. In this manner, a problem of excessive power consumption and a waste of link resources that are caused by a fact that the UE in the idle state or the inactive state needs to periodically enter the connected state to report the measurement result of the reference signals can be resolved.

For ease of understanding, in the following embodiments of this application, an example in which a location management device is an LMF, an access and mobility management device is an AMF, an access network device is an NG-RAN, and a location service entity is a 5GC LCS entity is used to describe an LPP protocol—based UE location information reporting method.

Figures 1, 7A:
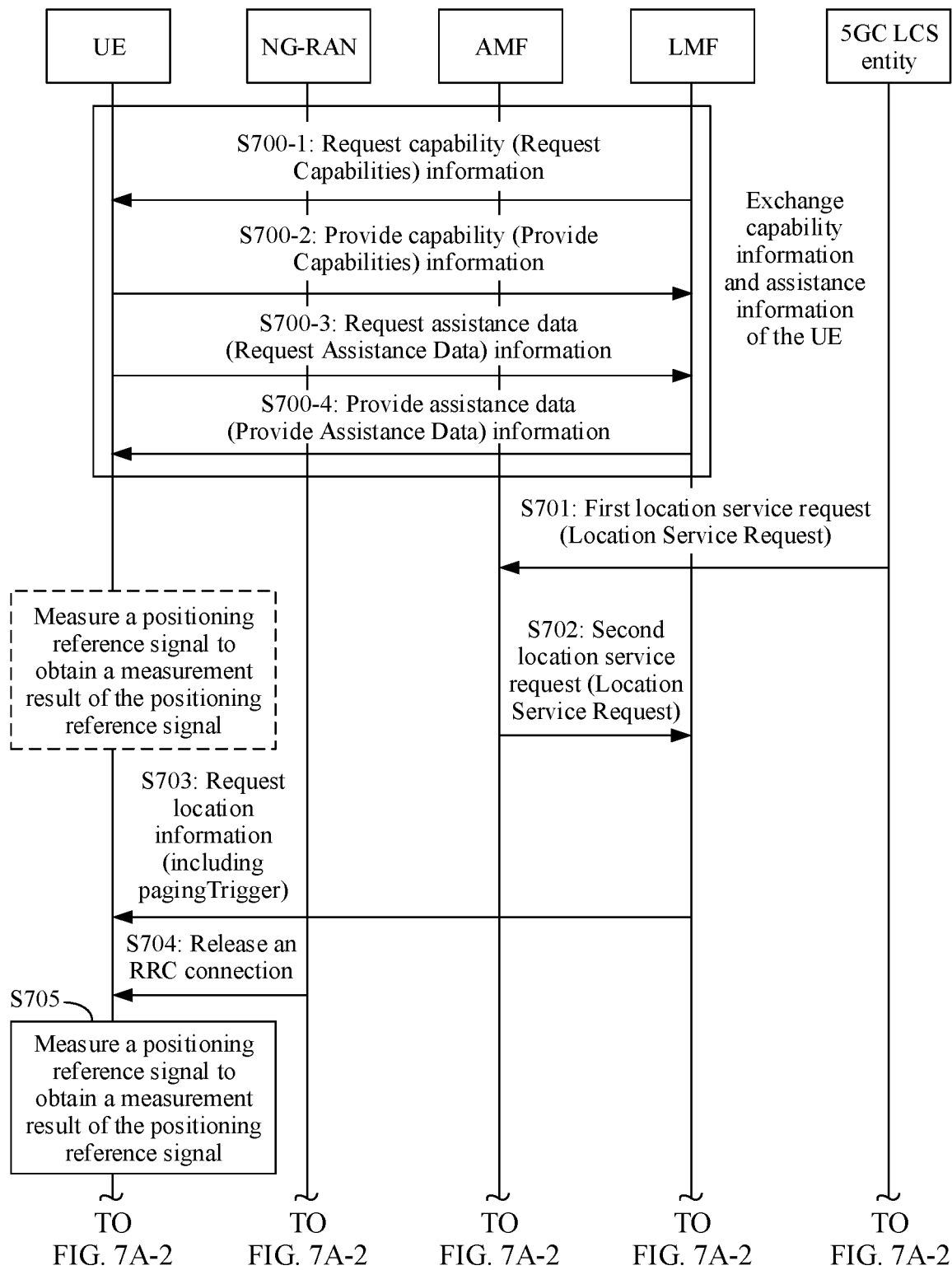
Figures 2, 7A:
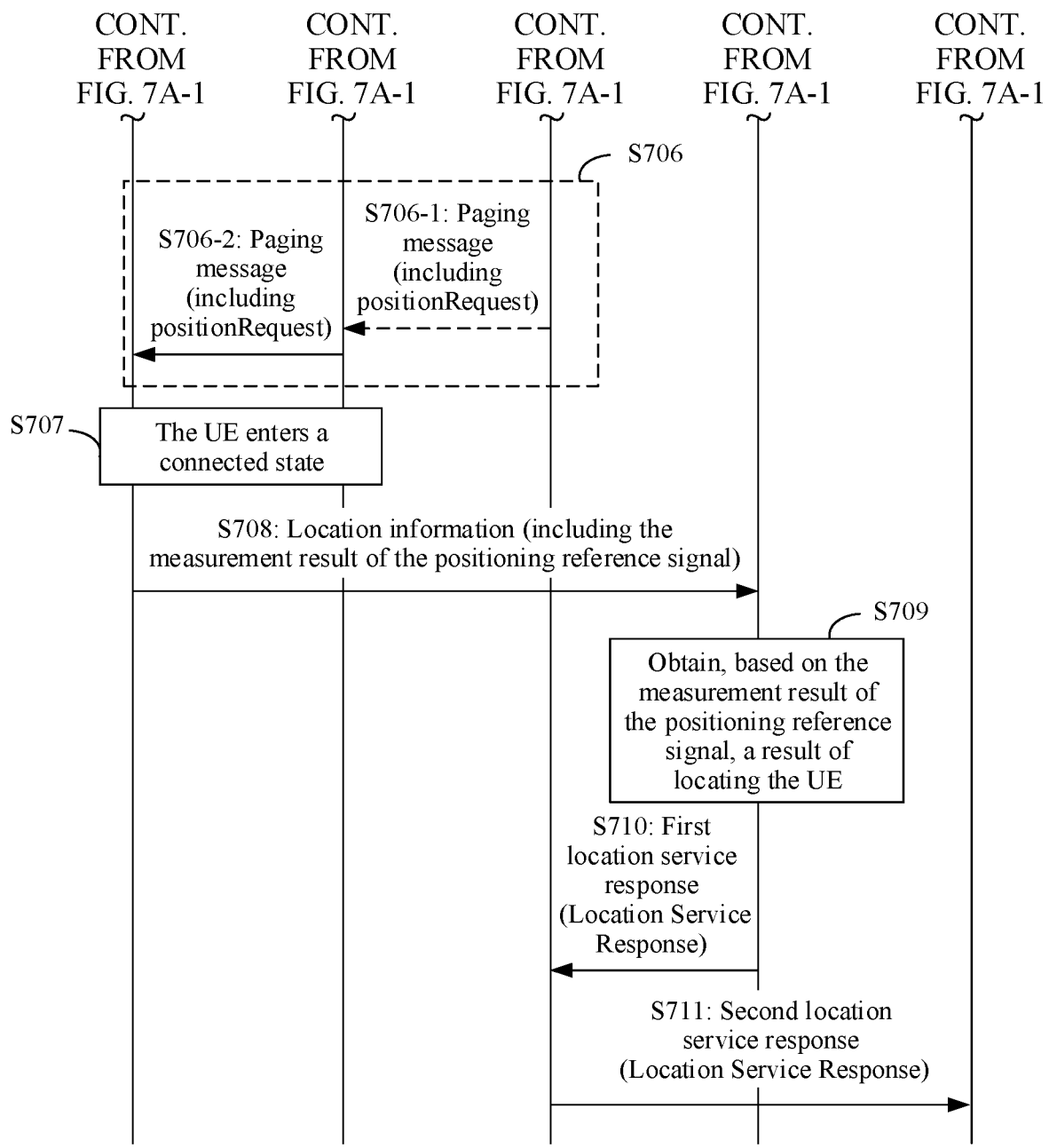

FIG. 7A-1 and FIG. 7A-2 are an interaction diagram 1 of a UE location information reporting method according to an embodiment of this application. As shown in FIG. 7A-1 and FIG. 7A-2, the UE location information reporting method provided in this embodiment of this application may include the following steps.

S701: A 5GC LCS entity sends a first location service request (Location Service Request) to an AMF. The first location service request is used to request to trigger locating of UE.

The 5GC LCS entity may be an application program or a client, or may be another entity that has a location service requirement, for example, an emergency call (emergency call). The 5GC LCS entity and a specific location service are not specifically limited in this embodiment of this application.

S702: The AMF sends a second location service request (Location Service Request) to an LMF. The second location service request is used to request to locate the UE.

S703: The LMF sends request location information to the UE. The request location information is used to indicate the UE to report, when receiving a paging message, a measurement result of a positioning reference signal.

The request location information (RequestLocationInformation) may include a paging trigger indication (such as pagingTrigger). For example, the paging trigger indication (such as pagingTrigger) may be included in a request location CommonIEsRequestLocationInformation information element IE of the request location information (RequestLocationInformation). The paging trigger indication is used to indicate the UE to report, when receiving the paging message, the measurement result of the positioning reference signal. For example, the paging trigger indication (such as pagingTrigger) may be included in a triggered reporting TriggeredReportingCriteria IE of the request location information (RequestLocationInformation).

Further, the request location information (RequestLocationInformation) may further include at least one of a periodical reporting indication, a preset time period reporting indication (such as ReportingDuration), or a serving cell change trigger indication (such as Cellchange). The periodical reporting indication is used to indicate the UE to periodically report the measurement result of the positioning reference signal. The preset time period reporting indication is used to indicate the UE to report the measurement result of the positioning reference signal in a preset time period. The serving cell change trigger indication (such as Cellchange) is used to trigger the UE to report, when a primary serving cell changes, the measurement result of the positioning reference signal.

For example, the request location information (RequestLocationInformation) may include the following content:

```
CommonIEsRequestLocationInformation ::= SEQUENCE {
locationInformationType LocationInformationType,
triggeredReporting TriggeredReportingCriteria     OPTIONAL,
-- Cond ECID
...
}
TriggeredReportingCriteria ::=     SEQUENCE {
cellChange    BOOLEAN,
reportingDuration ReportingDuration,
    pagingTrigger    BOOLEAN,
    ...
}
```

It should be noted that an existence form of the foregoing paging trigger indication (such as pagingTrigger) in the request location information (RequestLocationInformation) is merely used as an example. This is not limited in this embodiment of this application. For example, the paging trigger indication (such as pagingTrigger) may alternatively be included in the request location information (RequestLocationInformation) in another form.

S704: An NG-RAN releases an RRC connection to the UE.

In one case, after the NG-RAN releases the RRC connection to the UE, the UE enters an inactive state.

Figure 8A:
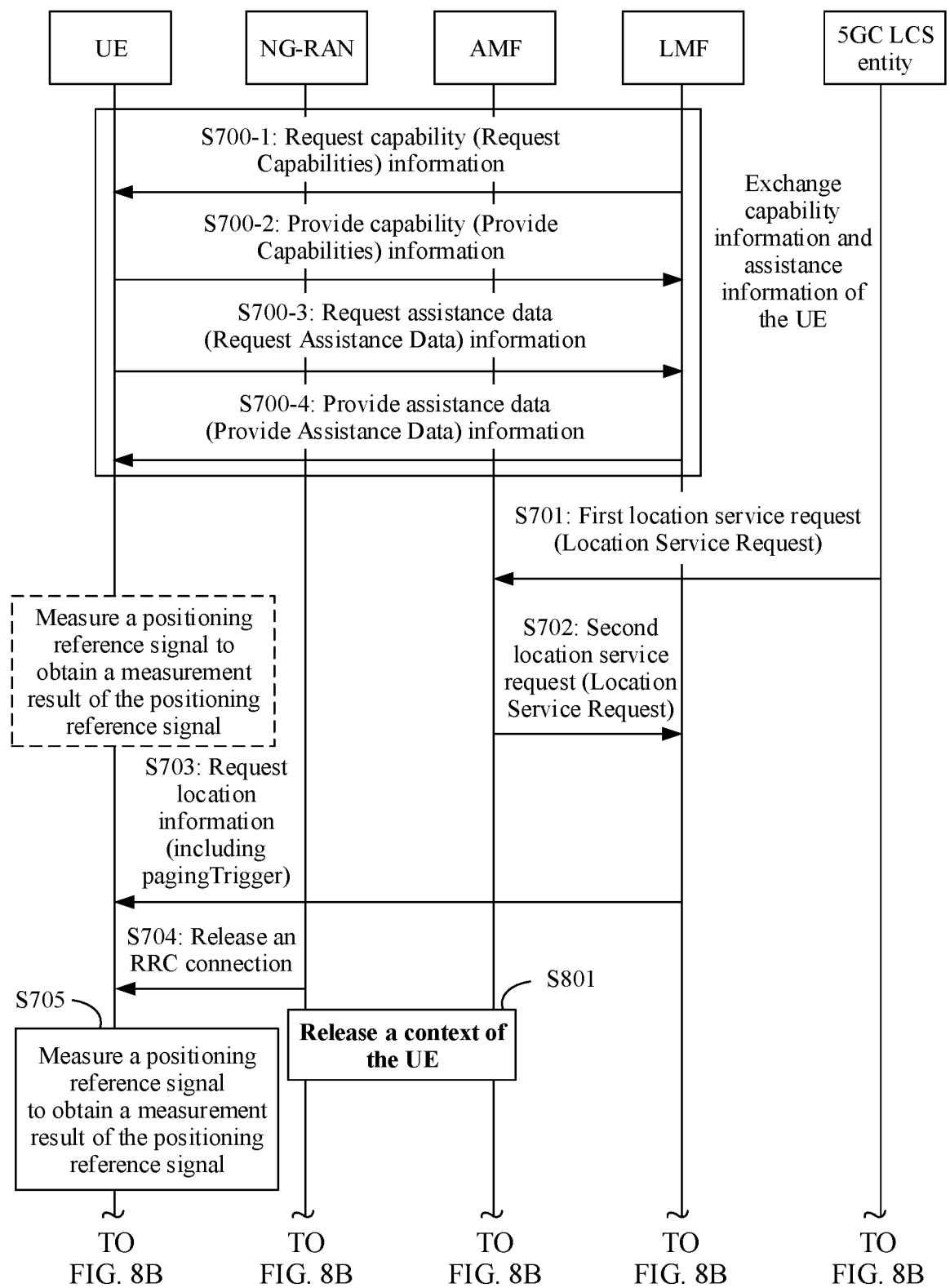
FIG. 8A and FIG. 8B are an interaction diagram 3 of a UE location information reporting method according to an embodiment of this application.
Figure 8B:
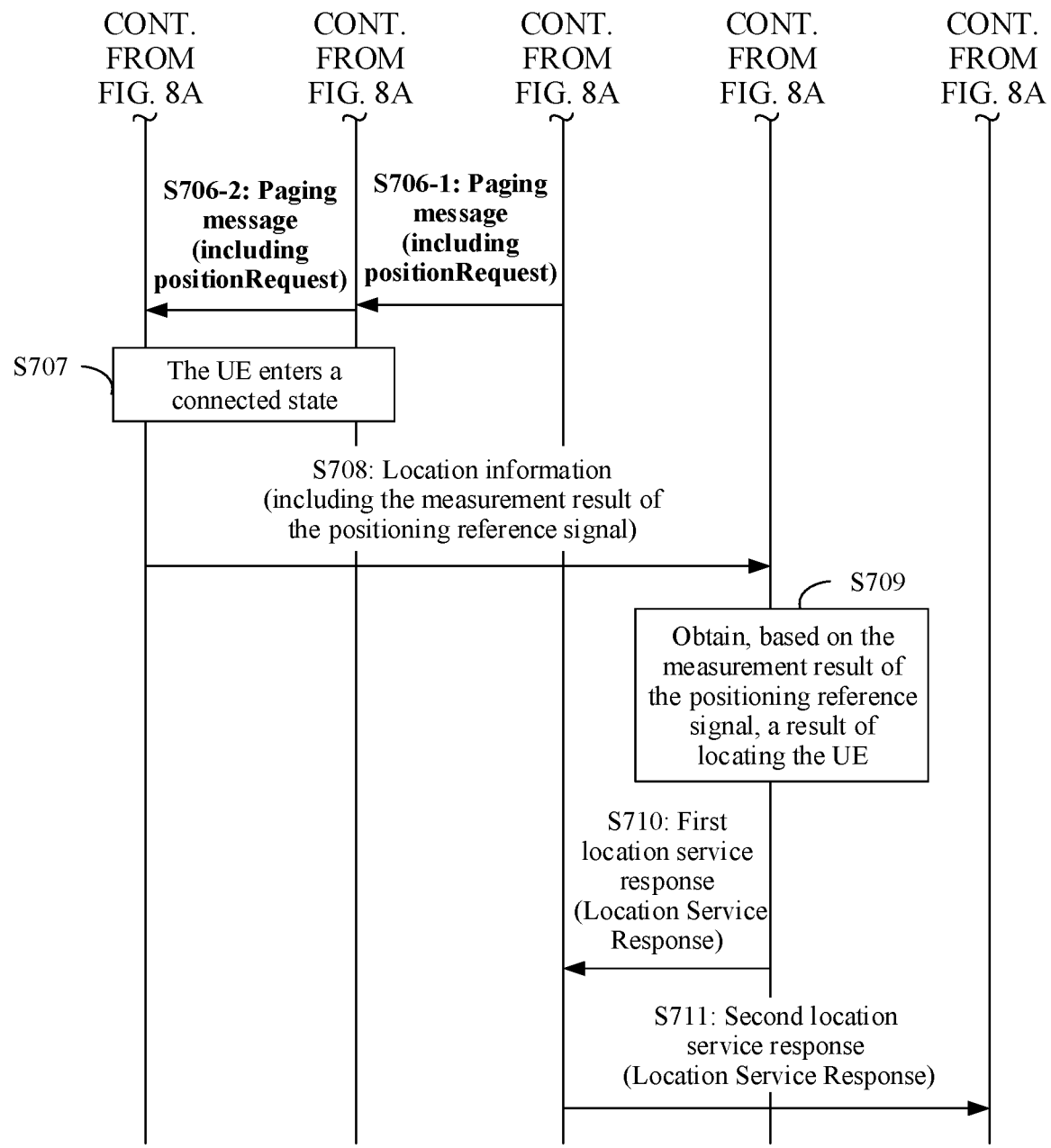

In another case, as shown in step S801 in FIG. 8A and FIG. 8B, after the NG-RAN releases the RRC connection to the UE, the NG-RAN further releases a context of the UE. In this case, the UE enters an idle state.

For a specific process in which the NG-RAN releases the RRC connection to the UE and the NG-RAN releases the context of the UE, refer to explanations and descriptions in a conventional technology. Details are not described herein.

S705: The UE measures the positioning reference signal to obtain the measurement result of the positioning reference signal.

The positioning reference signal may include but is not limited to one or more of a PRS, an SRS, CSI, or an SSB. The measurement result of the positioning reference signal may include but is not limited to one or more of RSRP, RSRQ, an RSTD, NRSRP, or NRSRQ. The UE in the idle state or the inactive state may trigger measurement on the positioning reference signal based on the request location information (RequestLocationInformation) from the LMF.

It should be noted that in this embodiment of this application, step S705 may alternatively be performed after step S706. In this case, the UE in the idle state or the inactive state may trigger measurement on the positioning reference signal based on the request location information (RequestLocationInformation) from the LMF after receiving the paging message.

In addition, optionally, in this embodiment of this application, before step S703, the UE may measure the positioning reference signal to obtain the measurement result of the positioning reference signal, as shown in FIG. 7A-1 and FIG. 7A-2. Specifically, the UE may periodically measure the positioning reference signal based on a preset measurement periodicity to obtain the measurement result of the positioning reference signal. Alternatively, the UE may measure the positioning reference signal in a preset time period to obtain the measurement result of the positioning reference signal. Alternatively, the positioning reference signal is measured according to another rule. This is not limited in this embodiment of this application.

S706: The UE receives the paging message (Paging).

Paging of the UE may be initiated by the AMF, or may be initiated by the NG-RAN, which depends on a status of the UE.

If the UE in the inactive state receives the paging message (Paging), in a possible case, the paging message (Paging) may be initiated by the AMF, as shown in S706-1 and S706-2 in FIG. 7A-1 and FIG. 7A-2. Specifically, the UE receives the paging message (Paging) sent by the AMF to the UE through the NG-RAN.

Figures 1, 7B:
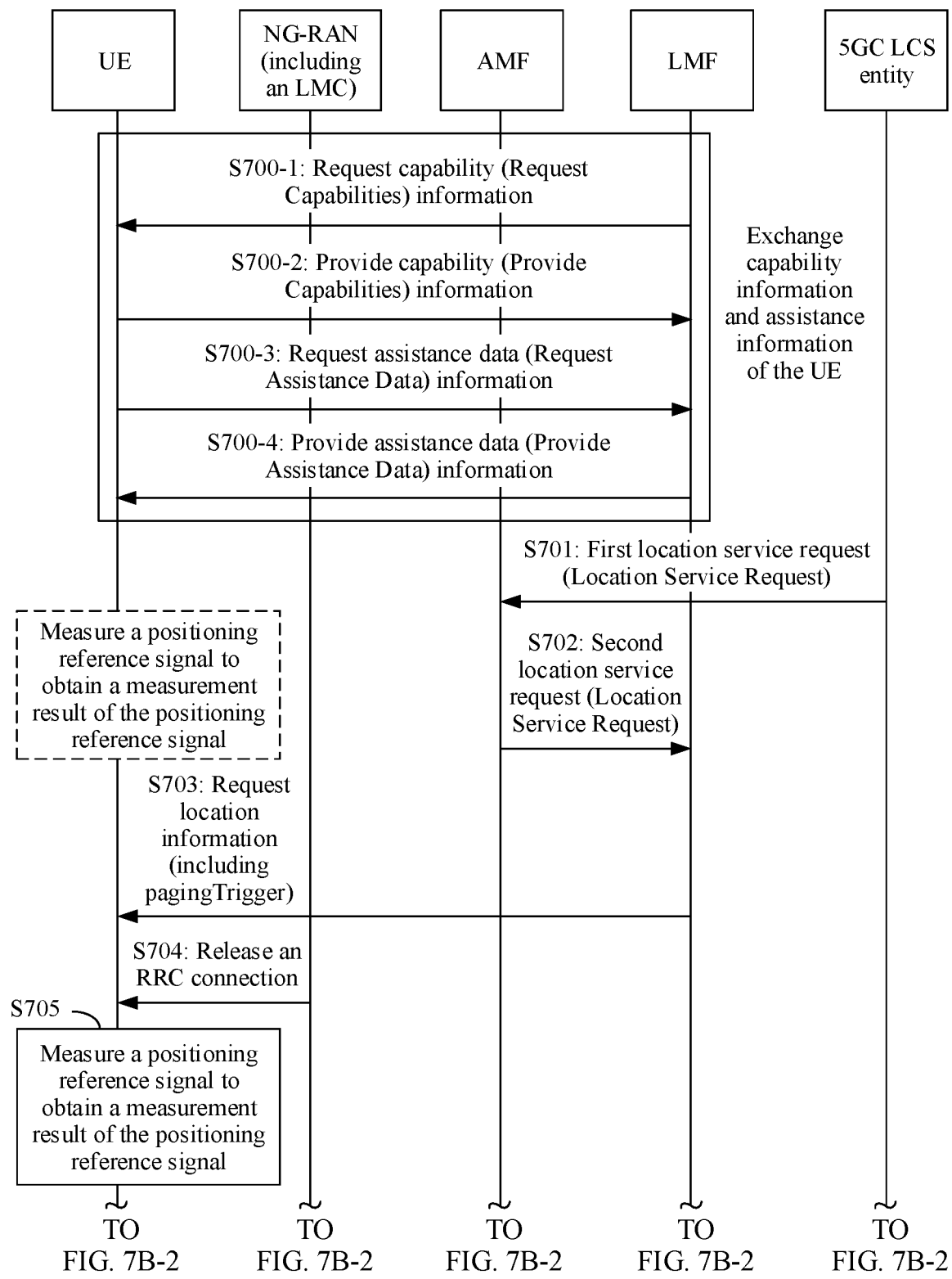
Figures 2, 7B:
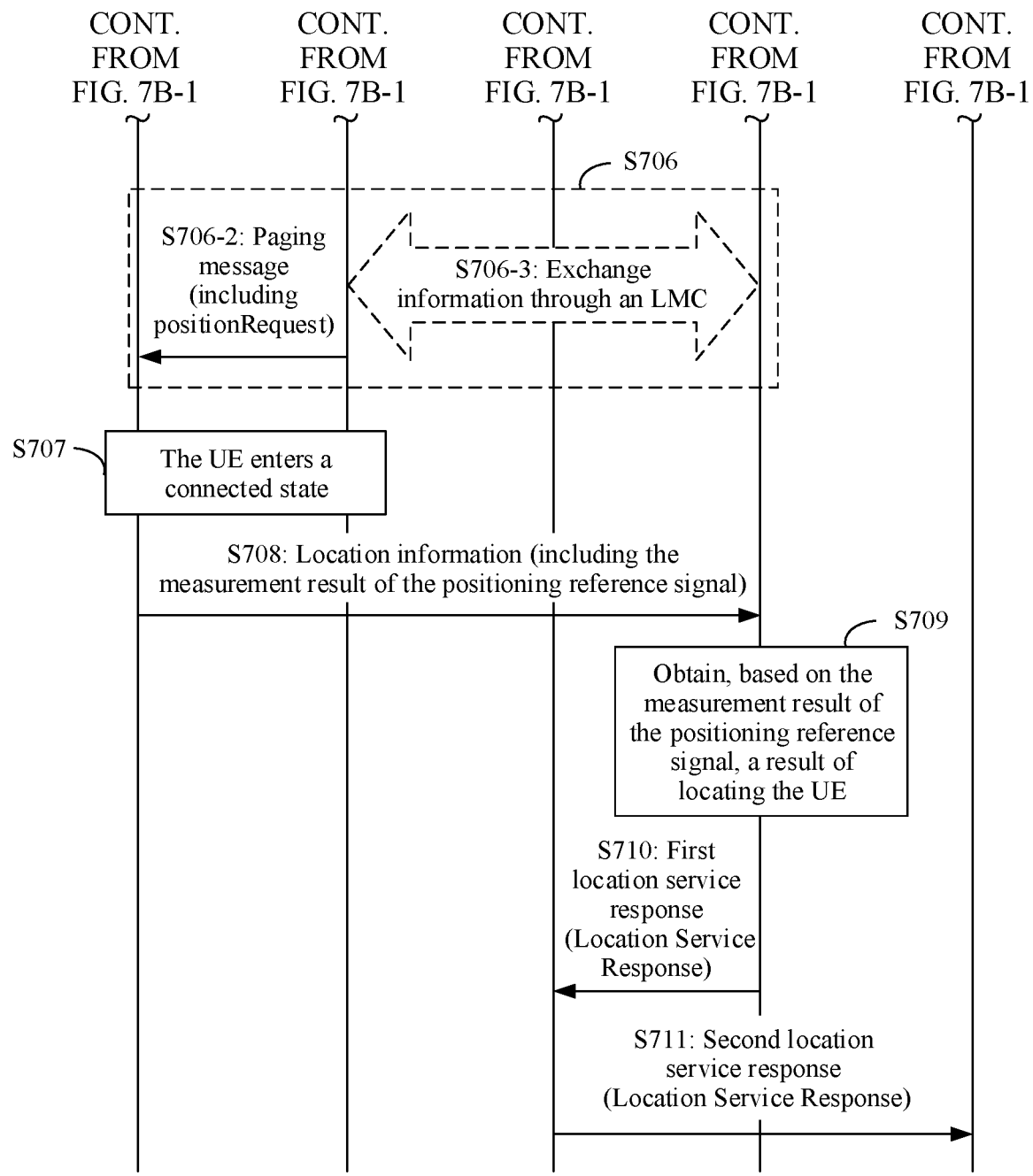

In another possible case, the paging message may be initiated by the NG-RAN. In this case, an LMC (as shown in FIG. 1A(b), in FIG. 1A(c), or in FIG. 1A(d)) is usually integrated into the NG-RAN. Specifically, the LMC may exchange information with the LMF (S706-3 in FIG. 7B-1 and FIG. 7B-2). For example, the LMC may report the status (such as the idle state or the inactive state) of the UE to the LMF, and the LMC may indicate, based on an indication of the LMC, the UE in the idle state or the inactive state to report a location.

If the UE in the idle state receives the paging message (Paging), the paging message (Paging) is usually initiated by the AMF. In this case, the paging message (Paging) is sent by the AMF to the UE through the NG-RAN, as shown in S706-1 and S706-2 in FIG. 8A and FIG. 8B.

Further, the paging message (Paging) may further include location request indication information (such as positionRequest or locationRequest). The location request indication information is used to indicate the UE to report the measurement result of the positioning reference signal. In this way, when receiving the paging message (Paging) including the location request indication information (such as positionRequest or locationRequest), the UE may be further triggered to report the measurement result of the positioning reference signal based on the paging message (Paging).

S707: The UE enters the connected state.

In one case, if the UE is in the inactive state before performing step S707, because the NG-RAN stores the context of the UE in the inactive state, the UE may quickly resume the RRC connection to the NG-RAN, and enter the connected state.

In another case, if the UE is in the idle state before performing step S707, the UE needs to set up the RRC connection to the NG-RAN again. A connection between the NG-RAN and the AMF is set up for the UE. Then, the UE enters the connected state.

For a process in which the UE enters the connected state from the inactive state/idle state, refer to explanations and descriptions in a conventional technology. Details are not described herein.

S708: The UE reports location information to the LMF. The location information includes the measurement result of the positioning reference signal.

For example, the UE may report the location information to the LMF by using provide location information (ProvideLocationInformation) in an LPP message.

The measurement result of the positioning reference signal that is reported by the UE to the LMF may include the measurement result of the positioning reference signal that is obtained by the UE by measuring the positioning reference signal in S705, and/or a measurement result of the positioning reference signal that is obtained by the UE by measuring the positioning reference signal before S703.

To be specific, if the UE does not measure the positioning reference signal before S703, the location information reported by the UE to the LMF in step S708 includes only the measurement result of the positioning reference signal that is obtained by the UE by measuring the positioning reference signal in S705.

If the UE measures the positioning reference signal before S703 to obtain the measurement result of the positioning reference signal, the UE may not perform S705. In this case, the location information reported by the UE to the LMF in S708 includes only the measurement result of the positioning reference signal that is obtained by the UE by measuring the positioning reference signal before S703. Alternatively, the UE may perform S705. In this case, the location information reported by the UE to the LMF in S708 includes both the measurement result of the positioning reference signal that is obtained by the UE by measuring the positioning reference signal in S705 and the measurement result of the positioning reference signal that is obtained by the UE by measuring the positioning reference signal before S703.

If the measurement result of the positioning reference signal that is reported by the UE to the LMF includes the measurement result of the positioning reference signal that is obtained by the UE by measuring the positioning reference signal in S705 and the measurement result of the positioning reference signal that is obtained by the UE by measuring (for example, periodically measuring or measuring in a preset time period) the positioning reference signal before S703, the LMF may draw a movement track of the UE based on measurement results at different moments. The drawing of the movement track of the UE may be used in some special application scenarios, for example, drawing a travel record for a user in a travel client.

Figure 9A:
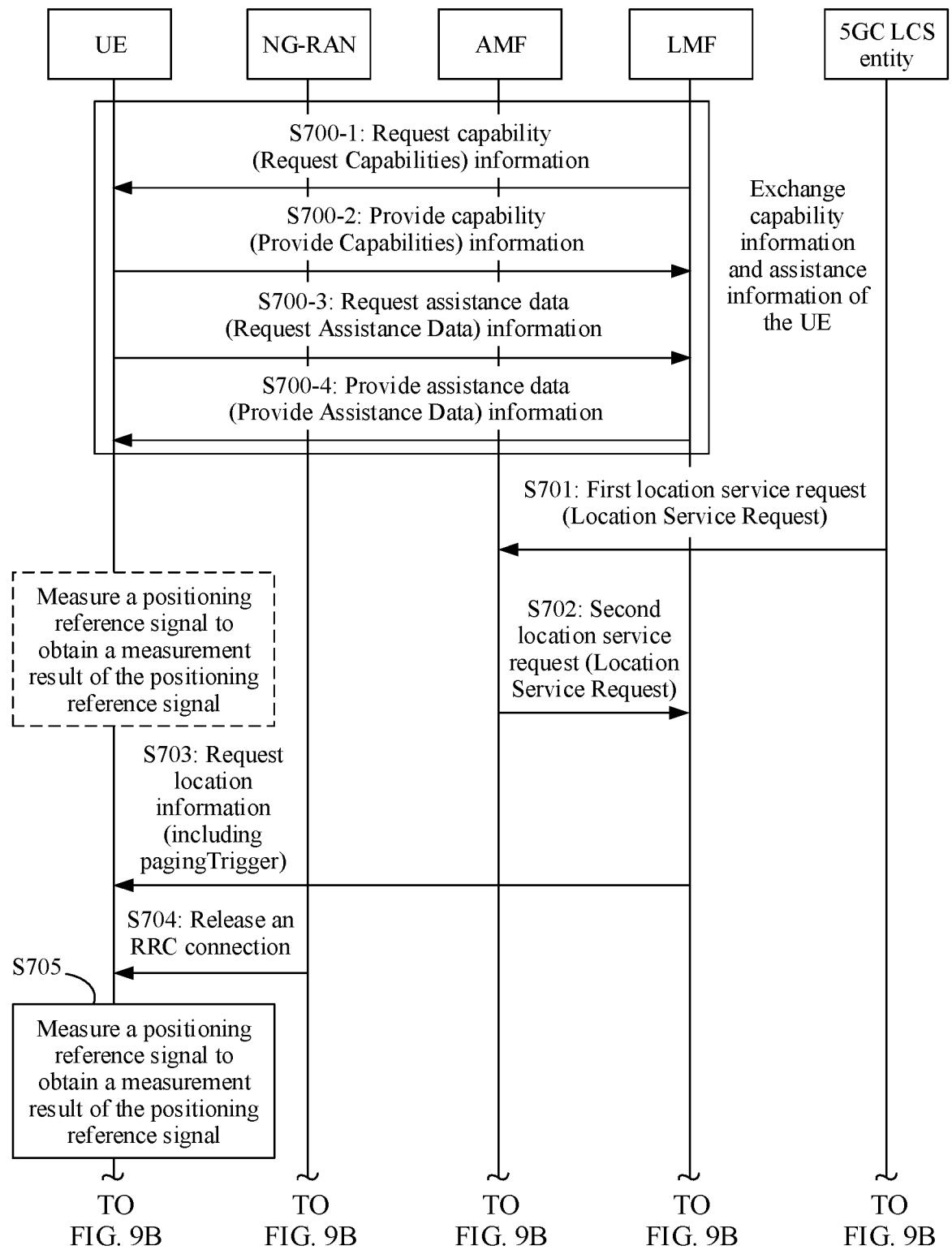
FIG. 9A and FIG. 9B are an interaction diagram 4 of a UE location information reporting method according to an embodiment of this application.
Figure 9B:
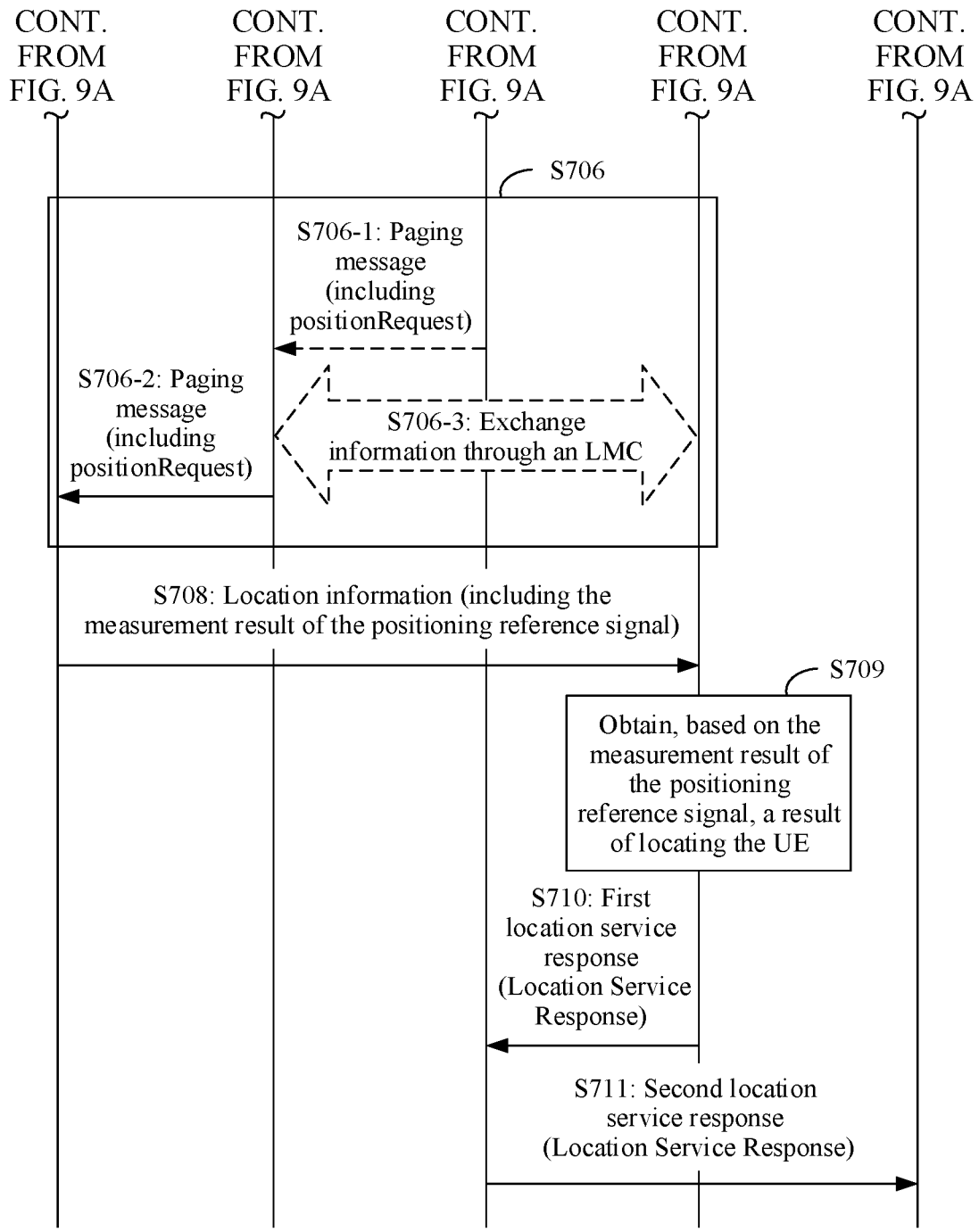

Optionally, the UE in the idle state or the inactive state may further report the location information to the LMF. As shown in FIG. 9A and FIG. 9B, after receiving the paging message (after performing S706), and obtaining the measurement result of the positioning reference signal, the UE does not perform S707, and directly performs S708. Specifically, the UE may report the measurement result of the positioning reference signal through early data transmission, by using a preconfigured resource in the idle state or the inactive state, or the like.

Similarly, after performing step S706-2 shown in FIG. 8A and FIG. 8B and obtaining the measurement result of the positioning reference signal, the UE may not perform step S707, and may directly perform step S708.

S709: The LMF obtains, based on the measurement result of the positioning reference signal, a result of locating the UE.

S710: The LMF sends a first location service response (Location Service Response) to the AMF.

The first location service response includes the result of locating the UE by the LMF.

S711: The AMF sends a second location service response (Location Service Response) to the 5GC LCS entity.

The second location service response includes the result of locating the UE by the LMF.

Further, before performing step S701, the UE may further exchange capability information and assistance information of the UE with the LMF. Specifically, as shown in FIG. 7A-1 and FIG. 7A-2, FIG. 7B-1 and FIG. 7B-2, FIG. 8A and FIG. 8B, and FIG. 9A and FIG. 9B, the UE location information reporting method provided in this embodiment of this application further includes the following steps.

S700-1: The LMF sends request capability (Request Capabilities) information to the UE, to request the capability information of the UE.

The capability information of the UE is used to indicate at least a locating mode type supported by the UE and/or a positioning reference signal measurement capability.

For example, the locating mode type supported by the UE may include but is not limited to one or more of a PRS-based locating mode, an SRS-based locating mode, a CSI-based locating mode, or an SSB-based locating mode.

The positioning reference signal measurement capability of the UE may include but is not limited to information types that may be obtained by the UE by measuring the positioning reference signal in different locating modes. For example, the positioning reference signal measurement capability of the UE may include: The UE may obtain, but not limited to, capability indication information of one or more of the RSRP, the RSRQ, the RSTD, the NRSRP, or the NRSRQ by measuring the PRS. Further, for UE with a strong computing capability, the positioning reference signal measurement capability of the UE may include: The UE may obtain capability indication information of preliminary location information of the UE through calculation by measuring the positioning reference signal.

S700-2: The UE sends provide capability (Provide Capabilities) information to the LMF, where the provide capability information includes the capability information of the UE.

S700-3: The UE sends request assistance data (Request Assistance Data) information to the LMF, to request the assistance information.

The assistance information may include but is not limited to one or more of cell indexes of a neighboring cell and a reference cell, a PRS configuration, or the like. For example, the PRS configuration may include a preset measurement periodicity of the PRS, a preset time period of the PRS, or the like.

S700-4: The LMF sends provide assistance data (Provide Assistance Data) information to the UE, where the provide assistance data information includes the assistance information.

It should be noted that in FIG. 7A-1 and FIG. 7A-2, FIG. 7B-1 and FIG. 7B-2, FIG. 8A and FIG. 8B, and FIG. 9A and FIG. 9B, an example in which a 5GC LCS entity triggers locating of the UE is used to describe the UE location information reporting method provided in this embodiment of this application. Actually, locating of the UE may be triggered by the AMF, or may be triggered by the LMF.

If locating of the UE is triggered by the AMF, a difference from locating of the UE triggered by the 5GC LCS entity lies in that the LMF sends the request location information to the UE based on the first location service request (Location Service Request) triggered by the AMF and the AMF does not need to send a response message to the 5GC LCS entity after receiving, from the LMF, the result of locating the UE obtained by the LMF based on the measurement result of the positioning reference signal that is reported by the UE.

Figure 10A:
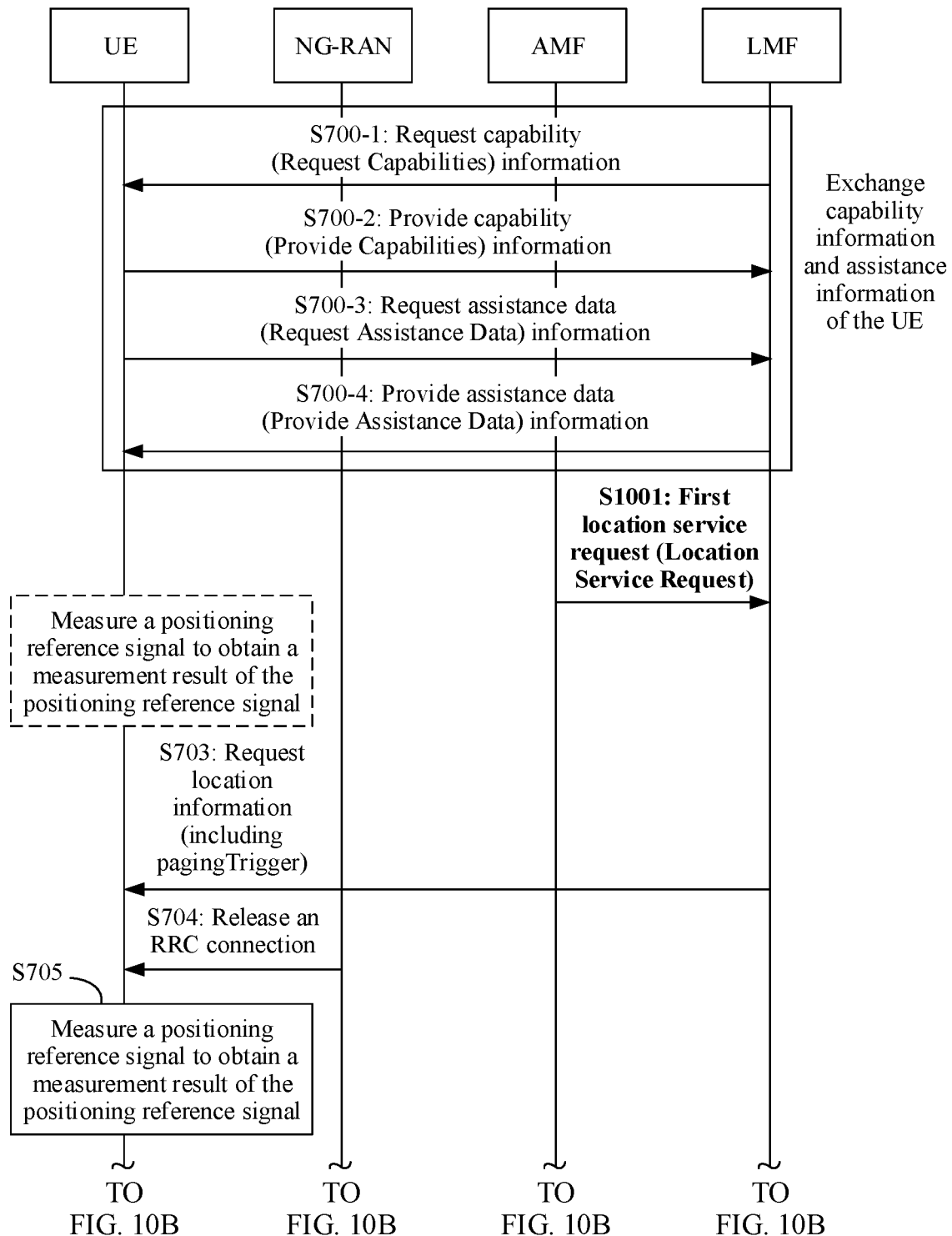
FIG. 10A and FIG. 10B are an interaction diagram 5 of a UE location information reporting method according to an embodiment of this application.
Figure 10B:
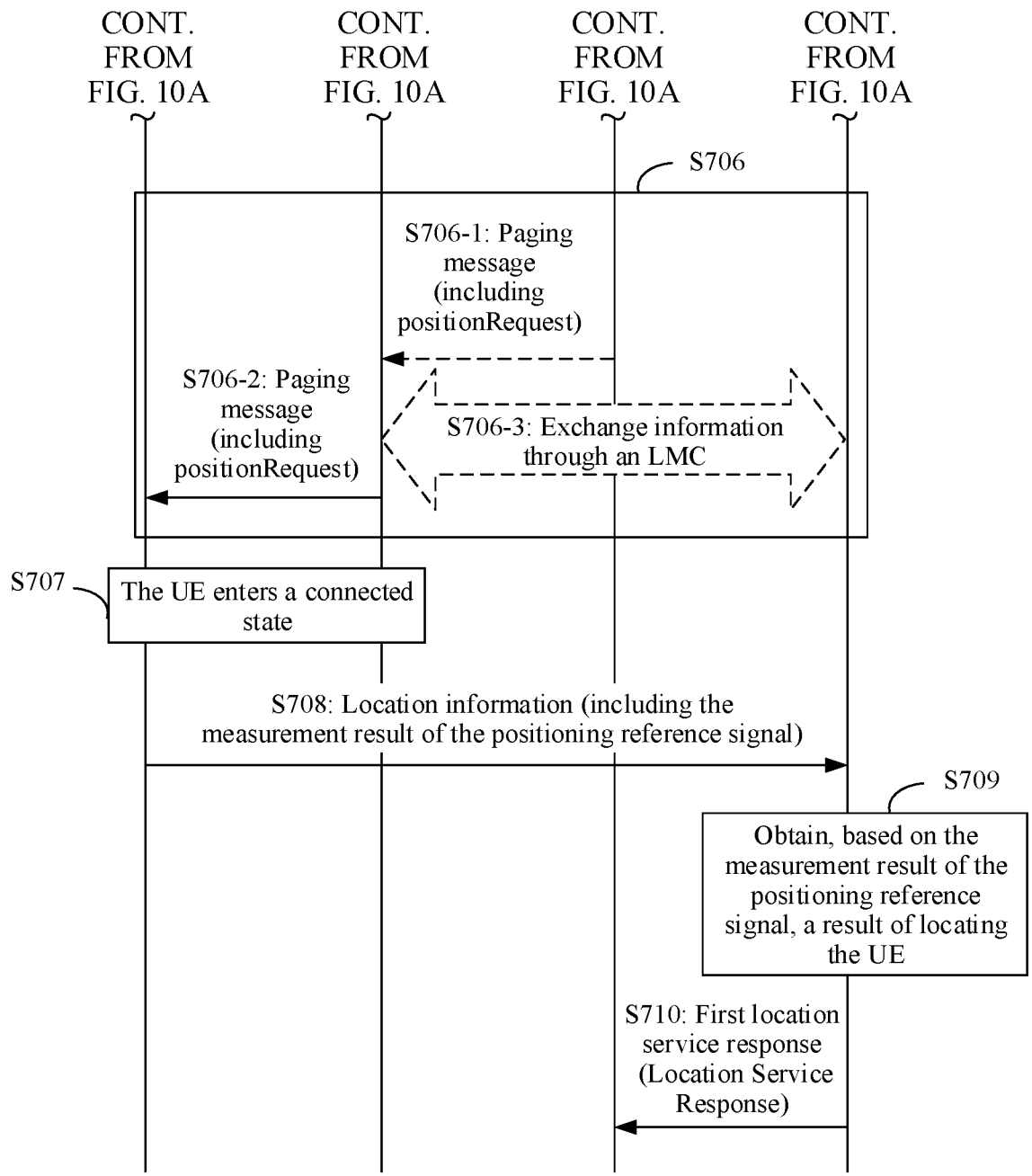

Specifically, if locating of the UE is triggered by the AMF, the UE may report the location information after entering the connected state from the inactive state. As shown in FIG. 10A and FIG. 10B, a UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes steps S1001 and S703.

Phase 3: A paging phase after an RRC connection is released. Specifically, the phase 3 includes steps S704, S705, and S706 (S706-1 and S706-2, or S706-2 and S706-3).

Phase 4: A location information reporting and location service response phase. Specifically, the phase 4 includes S707, S708, S709, and S710.

S1001: An AMF sends a first location service request (location service request) to an LMF. The first location service request is used to request to trigger locating of the UE.

Alternatively, if locating of the UE is triggered by the AMF, the UE may report location information after entering a connected state from an idle state. A UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes steps S1001 and S703.

Phase 3: Enter a paging phase after an RRC connection is released. Specifically, the phase 3 includes steps S704, S801, S705, and S706 (S706-1 and S706-2).

Phase 4: Enter a location information reporting and location service response phase. Specifically, the phase 4 includes steps S707, S708, S709, and S710.

Figure 11A:
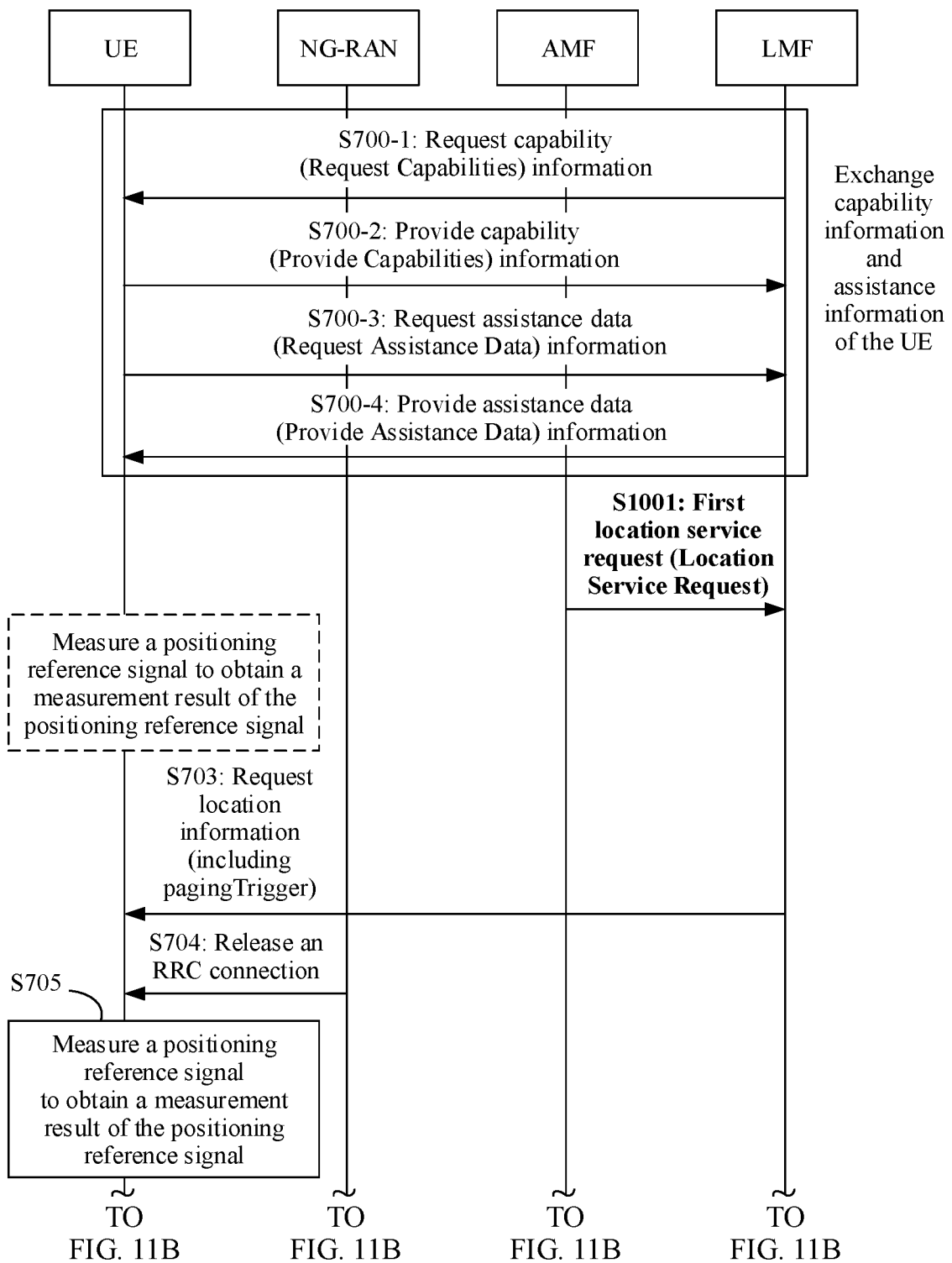
FIG. 11A and FIG. 11B are an interaction diagram 6 of a UE location information reporting method according to an embodiment of this application.
Figure 11B:
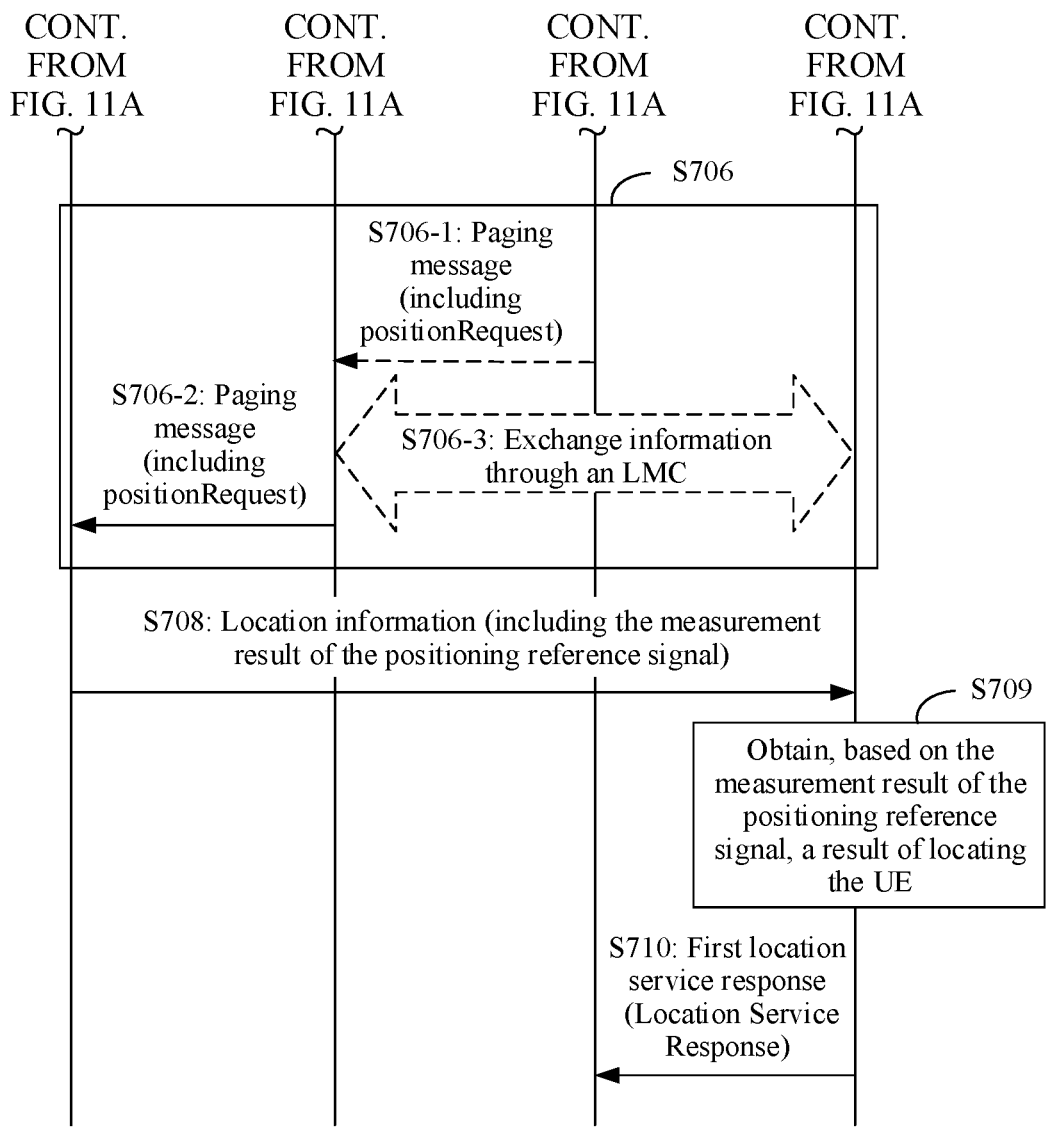

Alternatively, if locating of the UE is triggered by an AMF, the UE in an inactive state may report location information. As shown in FIG. 11A and FIG. 11B, a UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes steps S1001 and S703.

Phase 3: Enter a paging phase after an RRC connection is released. Specifically, the phase 3 includes steps S704, S705, and S706 (S706-1 and S706-2, or S706-2 and S706-3).

Phase 4: Enter a location information reporting and location service response phase. Specifically, the phase 4 includes steps S708, S709, and S710.

Alternatively, if locating of the UE is triggered by an AMF, the UE in an idle state may report location information. A UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes steps S1001 and S703.

Phase 3: Enter a paging phase after an RRC connection is released. Specifically, the phase 3 includes steps S704, S801, S705, and S706 (S706-1 and S706-2).

Phase 4: Enter a location information reporting and location service response phase. Specifically, the phase 4 includes steps S708, S709, and S710.

If locating of the UE is triggered by an LMF, a difference from locating of the UE by an AMF lies in that the LMF autonomously triggers to send the request location information to the UE and the LMF does not need to send a response message to the AMF after obtaining, based on a measurement result of a positioning reference signal that is reported by the UE, a result of locating the UE. In addition, if locating of the UE is triggered by the LMF, the AMF further needs to notify the LMF of a status of the UE, to indicate, based on an indication of the LMF, the UE in an idle state or an inactive state to report a location.

Figure 12A:
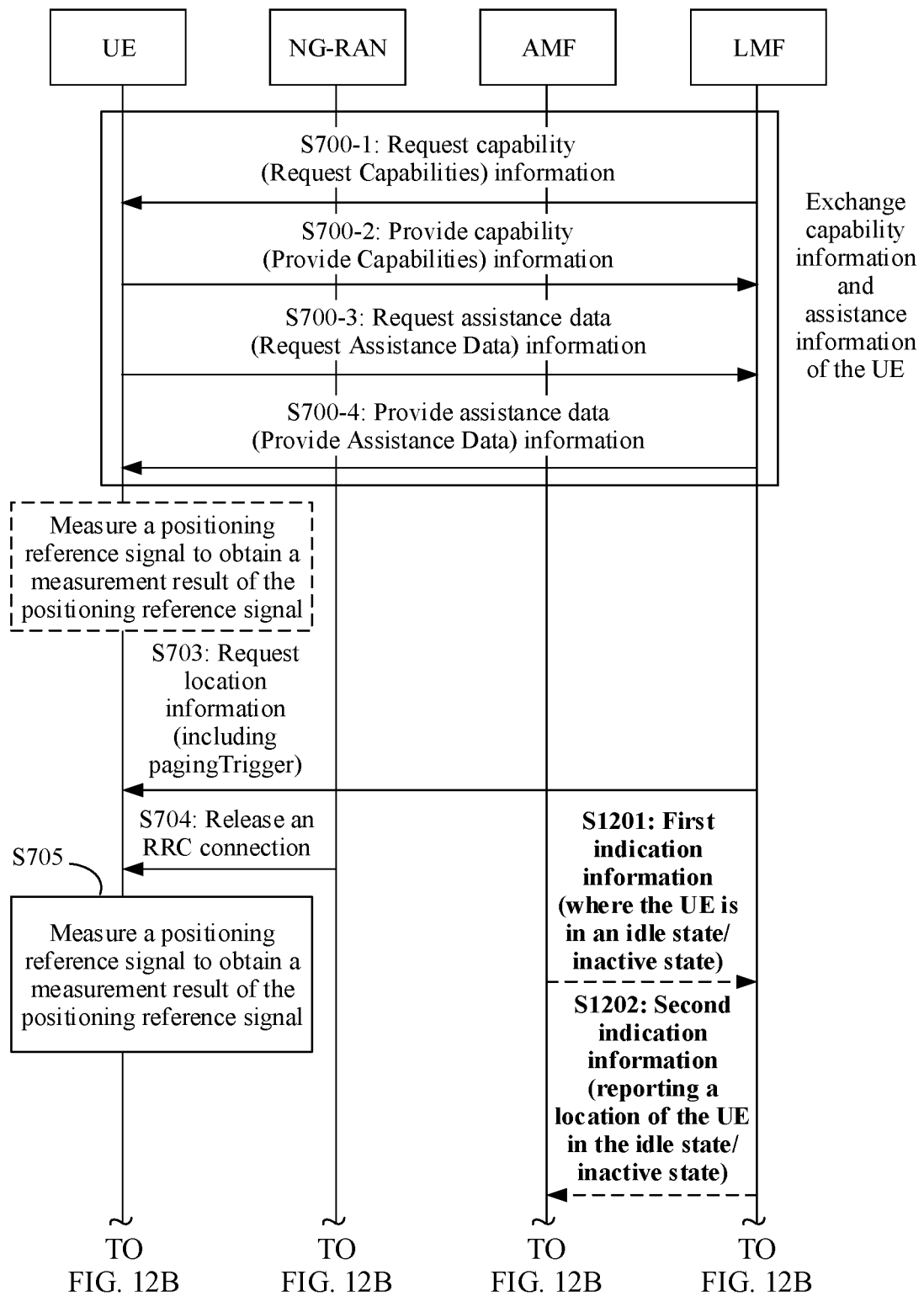
FIG. 12A and FIG. 12B are an interaction diagram 7 of a UE location information reporting method according to an embodiment of this application.
Figure 12B:
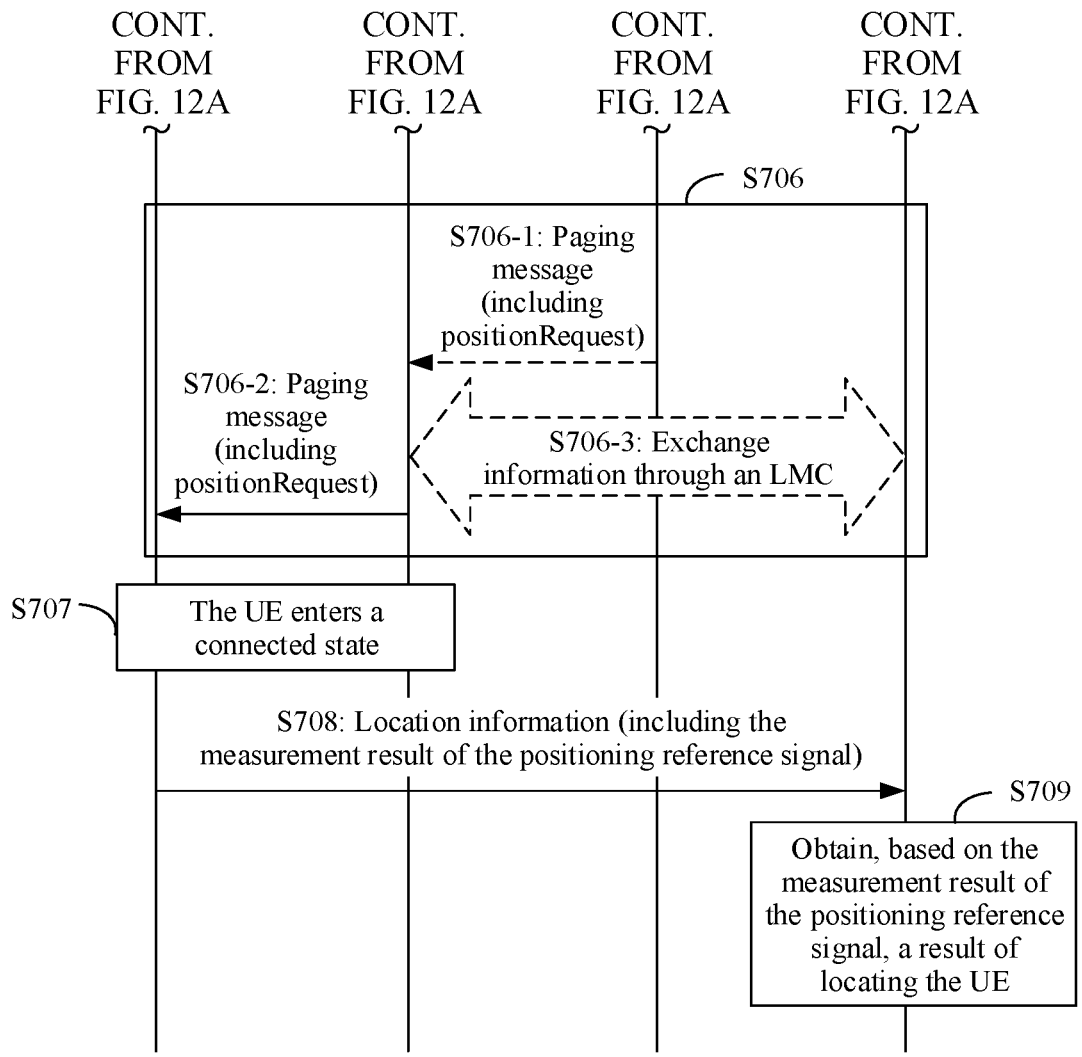

Specifically, if locating of the UE is triggered by the LMF, the UE may report location information after entering a connected state from the inactive state. As shown in FIG. 12A and FIG. 12B, a UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes step S703.

Phase 3: Enter a paging phase after an RRC connection is released. Specifically, the phase 3 includes steps S704, S705, S1201, S1202, and S706 (S706-1 and S706-2, or S706-2 and S706-3).

Phase 4: Enter a location information reporting and location service response phase. Specifically, the phase 4 includes steps S707, S708, and S709.

S1201: An AMF sends first indication information to an LMF.

The first indication information is used to indicate that the UE is in an idle state or an inactive state.

S1202: The LMF sends second indication information to the AMF.

The second indication information is used to indicate the AMF to report a location of the UE in the idle state or the inactive state.

In this case, location request indication information (such as positionRequest or locationRequest) included in a paging message (Paging) is included in the paging message (Paging) by the AMF based on the second indication information, to further indicate the UE to report a measurement result of a positioning reference signal.

It should be noted that a sequence of steps S1201, S1202, and S705 is not specifically limited in this embodiment of this application. To be specific, step S705 may be performed before S1201 and S1202, or may be performed after steps S1201 and S1202, or may be performed between S1201 and S1202, or may be performed simultaneously with S1201 or S1202.

In addition, it should be noted that steps S1201 and S1202 may not be performed (that is, S1201 and S1202 may be optional) when an LMC is deployed in an NG-RAN, and the LMF may indicate, through the LMC, the NG-RAN to include the location request indication information (such as positionRequest or locationRequest) in the paging message when the LMC is deployed in the NG-RAN.

Alternatively, if locating of the UE is triggered by the LMF, the UE may report location information after entering a connected state from the idle state. A UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes step S703.

Phase 3: Enter a paging phase after an RRC connection is released. Specifically, the phase 3 includes steps S704, S801, S705, S1201, S1202, and S706 (S706-1 and S706-2).

Phase 4: Enter a location information reporting and location service response phase. Specifically, the phase 4 includes steps S707, S708, and S709.

Figure 13A:
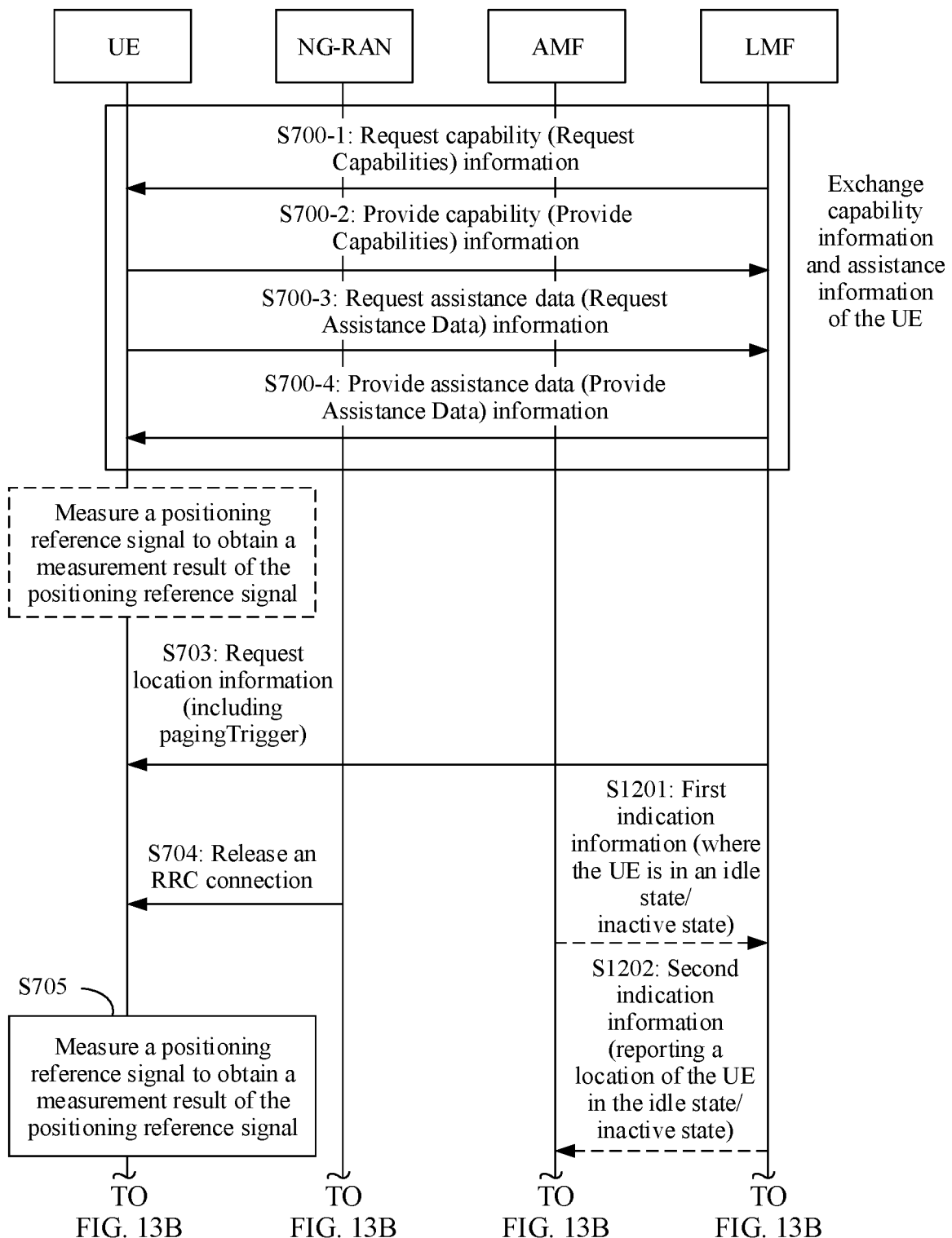
FIG. 13A and FIG. 13B are an interaction diagram 8 of a UE location information reporting method according to an embodiment of this application.
Figure 13B:
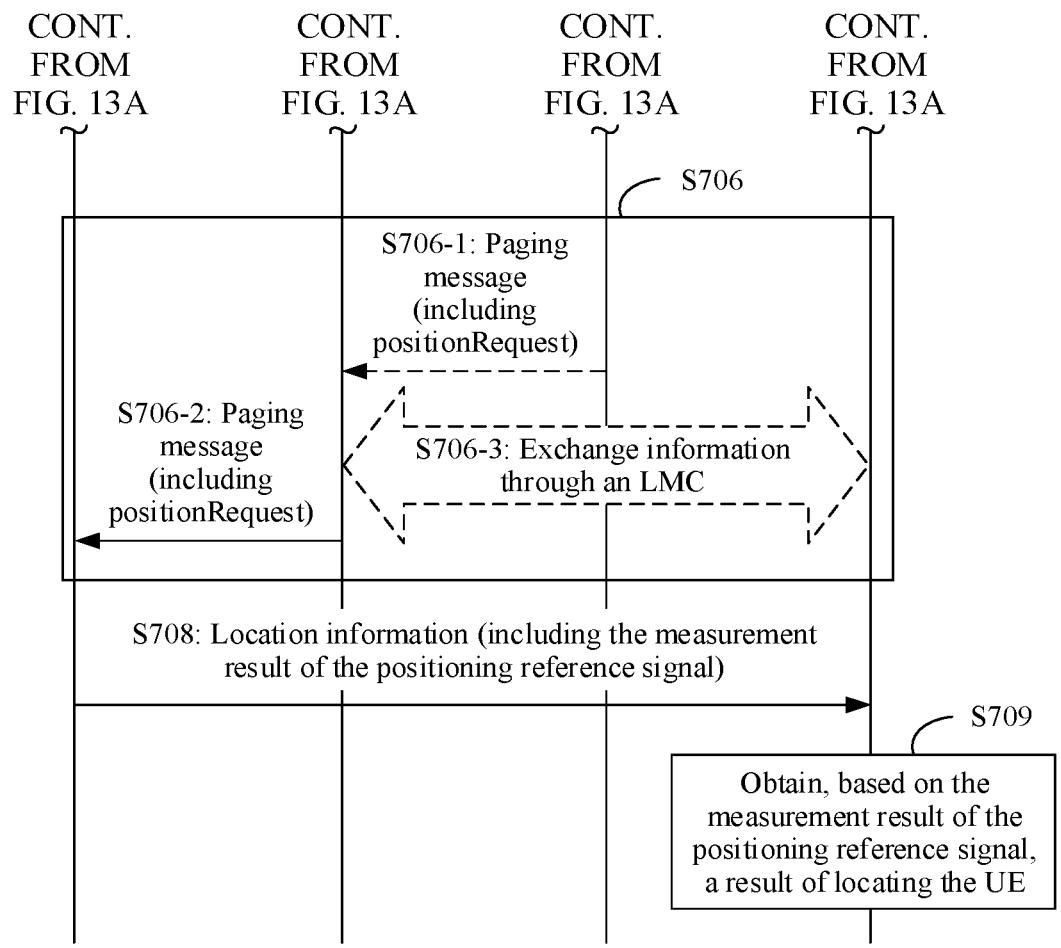

Alternatively, if locating of the UE is triggered by an LMF, the UE in an inactive state may report location information. As shown in FIG. 13A and FIG. 13B, a UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes step S703.

Phase 3: Enter a paging phase after an RRC connection is released. Specifically, the phase 3 includes steps S704, S705, S1201, S1202, and S706 (S706-1 and S706-2, or S706-2 and S706-3).

Phase 4: Enter a location information reporting and location service response phase. Specifically, the phase 4 includes steps S708 and S709.

Alternatively, if locating of the UE is triggered by an LMF, the UE in an idle state may report location information. A UE location information reporting method provided in an embodiment of this application may include the following phases.

Phase 1: Exchange capability information and assistance information of UE. Specifically, the phase 1 includes steps S700-1, S700-2, S700-3, and S700-4.

Phase 2: Send request location information (such as pagingTrigger). Specifically, the phase 2 includes step S703.

Phase 3: Enter a paging phase after an RRC connection is released. Specifically, the phase 3 includes steps S704, S801, S705, S1201, S1202, and S706 (S706-1 and S706-2).

Phase 4: Enter a location information reporting and location service response phase. Specifically, the phase 4 includes steps S708 and S709.

It should be noted that for specific execution details of the steps in FIG. 10A and FIG. 10B, FIG. 11A and FIG. 11B, FIG. 12A and FIG. 12B, and FIG. 13A and FIG. 13B, refer to explanations and descriptions of FIG. 7A-1 and FIG. 7A-2, FIG. 7B-1 and FIG. 7B-2, FIG. 8A and FIG. 8B, and FIG. 9A and FIG. 9B in embodiments of this application. Details are not described herein again.

It may be understood that in this embodiment of this application, the UE may report, based on an indication of the location management device (such as the LMF, the LMC, or the LMU), the measurement result obtained by the UE by measuring the plurality of positioning reference signals when receiving the paging message. The location management device (such as the LMF or the LMC) may determine the location of the UE based on the measurement result reported by the UE. According to the user equipment location information reporting method provided in this application, a problem of excessive power consumption and a waste of link resources that are caused by a fact that the UE in the idle state or the inactive state needs to periodically enter the connected state to report the measurement result of the reference signals can be resolved. The location management device (such as the LMF or the LMC) may include, in the request location information, the paging trigger indication (such as pagingTrigger) used to trigger the UE to report, when receiving the paging message, the measurement result of the positioning reference signal.

It may be understood that, to implement functions of any one of the foregoing embodiments, network elements such as user equipment UE, a location management device (such as an LMF), and an access and mobility management device (such as an AMF) include corresponding hardware structures and/or software modules for performing the functions. A person skilled in the art should easily be aware that, in combination with the units and algorithm steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application In embodiments of this application, functional modules of the user equipment UE, the location management device (such as the LMF), and the access and mobility management device (such as the AMF) may be obtained through division. For example, each functional module may be obtained through division based on a corresponding function, or two or more functions may be integrated into one processing module. The integrated module may be implemented in a form of hardware, or may be implemented in a form of a software functional module. It should be noted that in embodiments of this application, division into modules is an example, and is merely logical function division. During actual implementation, there may be another division manner.

Figure 14:
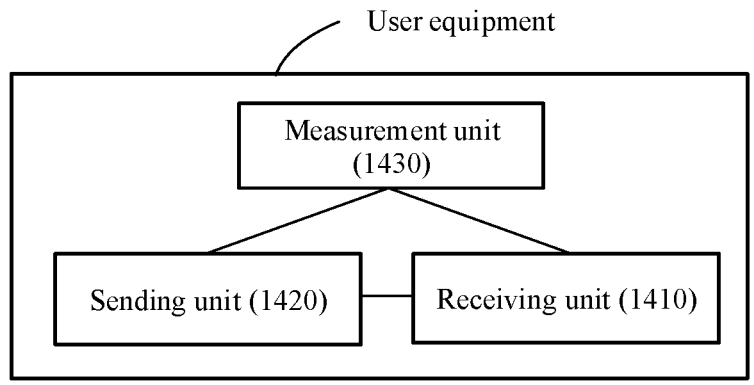
FIG. 14 is a schematic diagram of a structure of UE according to an embodiment of this application.

For example, when each functional module is obtained through division in an integrated manner, FIG. 14 is a schematic diagram of a structure of user equipment according to an embodiment of this application. The user equipment may include a receiving unit 1410, a sending unit 1420, and a measurement unit 1430.

The receiving unit 1410 is configured to support the user equipment in performing any one of step S501, S502, S700-1, S700-4, S703, S704, S706-2, or S707, and/or is configured to perform another process of the technology described in this specification. The sending unit 1420 supports the user equipment in performing any one of step S503, S504, S700-2, S700-3, or S708, and/or is configured to perform another process of the technology described in this specification. The measurement unit 1430 is configured to support the user equipment in performing the foregoing step S705 and the user equipment in measuring a positioning reference signal at other time according to any rule, and/or is configured to perform another process of the technology described in this specification.

In addition, in some cases, the receiving unit 1410 and the sending unit 1420 are further configured to assist in performing step S707, so that the UE enters a connected state. For example, the UE may send a random access request to an NG-RAN through the sending unit 1420, receive a random access request response from the NG-RAN through the receiving unit 1410, and the like.

Figure 15:
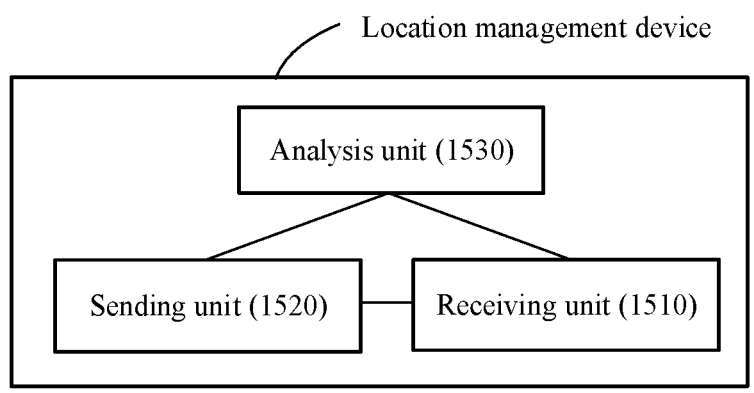
FIG. 15 is a schematic diagram of a structure of a location management device according to an embodiment of this application.

FIG. 15 is a schematic diagram of a structure of a location management device according to an embodiment of this application. The location management device may include a receiving unit 1510, a sending unit 1520, and an analysis unit 1530.

The sending unit 1520 is configured to support the location management device in performing any one of step S700-1, S700-4, S703, S710, or S1202, and/or is configured to perform another process of the technology described in this specification. The receiving unit 1510 is configured to support the location management device in performing any one of step S700-2, S700-3, S702, S708, S1001, or S1201, and/or is configured to perform another process of the technology described in this specification. The analysis unit 1530 is configured to support the location management device in performing the foregoing step S709, and/or is configured to perform another process of the technology described in this specification.

In some cases, an LMC is integrated in an NG-RAN, and the sending unit 1520 and the receiving unit 1510 are further configured to support the location management device in performing the foregoing step S706-3 to exchange information (such as a status of UE) with the NG-RAN.

Figure 16:
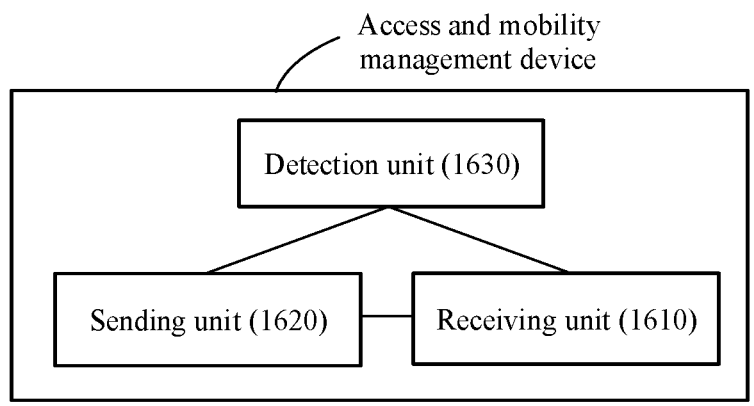
FIG. 16 is a schematic diagram of a structure of an access and mobility management device according to an embodiment of this application.

FIG. 16 is a schematic diagram of a structure of an access and mobility management device according to an embodiment of this application. The access and mobility management device may include a receiving unit 1610, a sending unit 1620, and a detection unit 1630.

The receiving unit 1610 is configured to support the mobility management device in performing any one of step S701, S710, or S1202, and/or is configured to perform another process of the technology described in this specification. The sending unit 1620 is configured to support the mobility management device in performing any one of step S702, S706-1, S711, S1001, or S1201, and/or is configured to perform another process of the technology described in this specification. The detection unit 1630 is configured to support the mobility management device in detecting a status of user equipment (such as an idle state, an inactive state, or a connected state), and/or is configured to perform another process of the technology described in this specification.

It should be noted that, all related content of each step in the foregoing method embodiments may be cited in function descriptions of a corresponding functional module. Details are not described herein again.

It should be noted that the sending unit 1420, the sending unit 1520, the sending unit 1620, the receiving unit 1410, the receiving unit 1510, and the receiving unit 1610 each may include a radio frequency circuit. Specifically, the network element may receive and send a radio signal through the radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an e-mail message, an SMS message service, and the like.

In an optional manner, when software is used to implement data transmission, the data transmission may be implemented completely or partially in a form of a computer program product. The computer program product includes one or more computer instructions. When the computer program instructions are loaded and executed on a computer, the procedure or functions according to embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, and microwave, or the like) manner. The computer-readable storage medium may be any usable medium accessible to a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid-state drive Solid State Disk (SSD)), or the like.

Method or algorithm steps described in combination with embodiments of this application may be implemented by hardware, or may be implemented by a processor by executing software instructions. The software instructions may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a detection apparatus. Certainly, the processor and the storage medium may alternatively exist in the detection apparatus as discrete components.

Based on the foregoing descriptions of the implementations, a person skilled in the art may clearly understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In an optional manner, this application provides a communication system. The communication system includes user equipment, a location management device, an access and mobility management device, and another network element related to a downlink locating process. The communication system is configured to implement the user equipment location information reporting method in any possible implementation provided in this application.

In an optional manner, this application provides a chip system. The chip system includes a processor and a memory. The memory stores instructions. When the instructions are executed by the processor, the user equipment location information reporting method in any possible implementation provided in this application is implemented. The chip system may include a chip, or may include a chip and another discrete component.

In the several embodiments provided in this application, it should be understood that the disclosed user equipment and method may be implemented in other manners. For example, the described apparatus embodiments are merely examples. For example, division into the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate components may or may not be physically separate, and components displayed as units may be one or more physical units, and may be located in one place, or may be distributed on a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing description is merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for reporting user equipment location information, wherein the method comprises:
    receiving, by user equipment, a first message from a location management device, wherein the first message comprises a paging trigger indication, and the paging trigger indication is used to trigger the user equipment to report, when receiving a paging message, a measurement result of a positioning reference signal;
    receiving, by the user equipment in an idle state or an inactive state, the paging message; and
    reporting, by the user equipment, the measurement result of the positioning reference signal based on the received paging message.

2. The method according to claim 1, wherein the reporting, by the user equipment, the measurement result of the positioning reference signal based on the received paging message comprises:
    reporting, by the user equipment, the measurement result of the positioning reference signal to the location management device based on the received paging message.

3. The method according to claim 1, wherein the receiving, by the user equipment in an idle state or an inactive state, the paging message comprises:
    receiving, by the user equipment in the idle state, the paging message from an access network device or an access and mobility management device; or
    receiving, by the user equipment in the inactive state, the paging message from an access network device.

4. The method according to claim 1, wherein the paging message comprises location request indication information, and the location request indication information indicates the user equipment to report the measurement result of the positioning reference signal based on the paging message.

5. The method according to claim 2, wherein the reporting, by the user equipment, the measurement result of the positioning reference signal to the location management device based on the received paging message comprises:

reporting, by the user equipment in a connected state, the measurement result of the positioning reference signal to the location management device; or reporting, by the user equipment in the idle state or the inactive state, the measurement result of the positioning reference signal to the location management device.

6. The method according to claim 1, wherein the measurement result of the positioning reference signal comprises one or more of the following information: reference signal received power (RSRP), reference signal received quality (RSRQ), a reference signal time difference (RSTD), narrowband reference signal received power (NRSRP), or narrowband reference signal received quality (NRSRQ).

7. The method according to claim 1, wherein the measurement result of the positioning reference signal comprises a result of measuring the positioning reference signal by the user equipment in the idle state or the inactive state.

8. The method according to claim 7, wherein the measurement result of the positioning reference signal further comprises a result of measuring the positioning reference signal by the user equipment in a connected state.

9. The method according to claim 1, wherein the location management device comprises either a location management network element (LMF) or a location management component (LMC).

10. The method according to claim 1, wherein before the receiving, by user equipment, a first message, the method further comprises:
   sending, by the user equipment, capability information of the user equipment to the location management device; and
   receiving, by the user equipment, assistance information from the location management device, wherein the capability information of the user equipment indicates at least one of a locating mode type supported by the user equipment or a positioning reference signal measurement capability.

11. A method for reporting user equipment location information, wherein the method comprises:
   sending, by a location management device, a first message to user equipment, wherein the first message comprises a paging trigger indication, and the paging trigger indication is used to trigger the user equipment to report, when receiving a paging message, a measurement result of a positioning reference signal to the location management device; and
   receiving, by the location management device, the measurement result of the positioning reference signal from the user equipment, wherein the user equipment is triggered to report the measurement result of the positioning reference signal to the location management device based on the received paging message.

12. The method according to claim 11, wherein the method further comprises:
   receiving, by the location management device, first indication information from an access and mobility management device, wherein the first indication information indicates that the user equipment is in an idle state or an inactive state; and
   sending, by the location management device, second indication information to the access and mobility management device, wherein the second indication information indicates the access and mobility management device to report location information of the user equipment in the idle state or the inactive state.

13. The method according to claim 11, wherein the measurement result of the positioning reference signal comprises one or more of the following information: reference signal received power (RSRP), reference signal received quality (RSRQ), a reference signal time difference (RSTD), narrowband reference signal received power (NRSRP), or narrowband reference signal received quality (NRSRQ).

14. The method according to claim 11, wherein the location management device comprises either a location management network element (LMF) or a location management component (LMC).

15. The method according to claim 11, wherein:
   before the sending, by a location management device, a first message to user equipment, the method further comprises:
      receiving, by the location management device, a location service request from the access and mobility management device, wherein the location service request is used to request to locate the user equipment; and
   after the receiving, by the location management device, the measurement result of the positioning reference signal from the user equipment, the method further comprises:
      sending, by the location management device, a location service response to the access and mobility management device, wherein the location service response comprises a result of locating the user equipment by the location management device.

16. The method according to claim 11, wherein the location management device autonomously sends the first message to the user equipment.

17. The method according to claim 11, wherein before the sending, by a location management device, a first message to user equipment, the method further comprises:
   receiving, by the location management device, capability information of the user equipment from the user equipment; and
   sending, by the location management device, assistance information to the user equipment, wherein the capability information of the user equipment indicates at least one of a locating mode type supported by the user equipment or a positioning reference signal measurement capability.

* * * * *